United States Patent [19]

Shishikura et al.

[11] Patent Number: 5,051,325

[45] Date of Patent: Sep. 24, 1991

[54] SECONDARY BATTERY

[75] Inventors: Toshikazu Shishikura; Masataka Takeuchi; Yoshihiko Murakoshi; Hiroshi Konuma; Mutsumi Kameyama, all of Tokyo, Japan

[73] Assignees: Showa Denko K.K.; Hitachi Ltd., both of Tokyo, Japan

[21] Appl. No.: 274,255

[22] Filed: Nov. 21, 1988

[30] Foreign Application Priority Data

| Nov. 20, 1987 | [JP] | Japan | 62-291804 |
| Dec. 1, 1987 | [JP] | Japan | 62-305295 |
| Apr. 21, 1988 | [JP] | Japan | 63-98743 |
| Apr. 22, 1988 | [JP] | Japan | 63-99614 |
| Jul. 7, 1988 | [JP] | Japan | 63-169384 |

[51] Int. Cl.$^5$ .................................... H01M 10/40
[52] U.S. Cl. ..................... 429/197; 429/218; 429/232; 252/182.1
[58] Field of Search .............. 429/218, 194, 197, 196, 429/232; 252/182.1

[56] References Cited

U.S. PATENT DOCUMENTS

| 4,301,220 | 11/1981 | Evans | 429/197 |
| 4,668,596 | 5/1987 | Shacklette et al. | 429/194 |
| 4,695,521 | 9/1987 | Shacklette et al. | 429/194 |
| 4,737,424 | 4/1988 | Tobishima et al. | 429/197 X |
| 4,753,858 | 6/1988 | Jow | 429/194 |
| 4,770,959 | 9/1988 | Koyama et al. | 429/194 |
| 4,780,381 | 10/1988 | Shacklette et al. | 429/197 |
| 4,804,596 | 2/1989 | Ebner et al. | 429/194 |
| 4,818,647 | 4/1989 | Plichta | 429/218 |

Primary Examiner—Anthony Skapars
Attorney, Agent, or Firm—Sughrue, Mion, Zinn, Macpeak & Seas

[57] ABSTRACT

A secondary battery comprised of a positive electrode, a negative electrode and a non-aqueous electrolyte, wherein the positive electrode comprises a sodium-cobalt oxide as the main component, the negative electrode is composed of a composite body comprising a sodium alloy such as a sodium/lead or sodium/tin alloy, a carbon material and a binder, and the non-aqueous electrolyte is composed of a sodium salt and an ether compound. The positive electrode and negative electrode is prepared by a process wherein a binder is swollen with or dissolved in an organic solvent, the swollen or dissolved binder is mixed with a carbon material, and the mixture is then mixed with a sodium alloy or a sodium-cobalt oxide directly or after removal of the organic solvent.

15 Claims, 8 Drawing Sheets

SECONDARY BATTERY

BACKGROUND OF THE INVENTION (1) Field of the Invention

The present invention relates to a secondary battery having a high energy density, a low self-discharge rate and a long cycle life.

(2) Description of the Related Art

A secondary battery in which lithium metal, one of the alkali metals, is used for the negative electrode is well known, and the secondary battery of this type is outlined, for example, by M. Hughes et al. in Journal of Power Sources, 12, pages 83–144 (1984). With regard to the problem of the lithium metal negative electrode, this reference points out that, since lithium is overactive, it reacts with an electrolyte, especially a solvent, to form an insulating film and cause growth of a dendrite during charging or discharging, and thus the charging or discharging efficiency is reduced or a short circuit occurs between positive and negative electrodes. To solve this problem, an attempt was made to use a lithium-/aluminum alloy for the negative electrode, to reduce the activity of the negative electrode and control the reaction with the electrolyte, but, it is known that, if the charging/discharging cycle is repeated, the alloy becomes powdery and is easily broken. The results of an examination of the electrode characteristics of alloys of lithium with other metals are revealed by A. N. Dey in J. Electrochem. Soc., 118, No. 10, pages 1547–1549 (1971). This reference shows the results of comparative tests of changes of Li+ plating potentials and plating current efficiencies, made with respect to alloys of lithium with one metal selected from Sn, Pb, Al, Au, Pt, Zn, Cd, Ag and Mg and combinations of lithium with metals which are difficult to form into an alloy such as Ti, Cu, and Ni.

Furthermore, Japanese Examined Patent Publication No. 48-24302 proposes a secondary battery comprising lithium as the negative electrode active substance and a nickel halide as the positive electrode active substance, in which, to improve the charging efficiency of the lithium electrode and realize a good maintenability, a powdery mixture containing powdery lithium, which is bonded, together with a permanently conductive substance such as nickel powder or degassed granular carbon, to a grid support structure through a binder such as polyethylene or carboxymethyl cellulose, is used instead of a lithium foil.

Japanese Unexamined Patent Publication No. 59-14264 proposes a double-charging type lithium negative electrode especially suitable for a battery operated by an ionic polymer, i.e., a flexible composite anode comprising a lithium-containing finely divided alloy or intermetallic compound such as lithium/aluminum, lithium/silicon, lithium/antimony, lithium/bismuth or lithium/boron, or finely divided lithium, a plastic or elastomer type polymeric substance having an ionic conductivity, and a finely divided carbon additive such as carbon black or graphite.

Japanese Unexamined Patent Publication No. 59-132576 proposes a lithium negative electrode comprising a layer of a conductive polymer capable of forming a lithium ion-inserted compound, which is arranged on a lithium surface confronting a positive electrode active substance of a lithium secondary battery; Japanese Unexamined Patent Publication No. 59-157973 proposes an electrode for a secondary battery, which comprises a carbon fiber layer formed on the surface of an alkali metal; and Japanese Examined Patent Publication No. 59-186274 proposes a secondary battery comprising a negative electrode formed by using a material capable of absorbing an alkali metal ion at the time of charging, and releasing the alkali metal ion at the time of discharging, i.e., a fusible alloy, in which the alkali metal and the negative electrode material are compressed and integrated to improve the cycle life.

Japanese Unexamined Patent Publication No. 60-262351 proposes the use of a composite material of a lithium alloy and a conductive organic polymer to obtain a negative electrode in which a reduction of the performance does not occur even at a high lithium utilization ratio, and Japanese Unexamined Patent Publication No. 61-245474 proposes a non-aqueous secondary battery composed of a polymer having a main chain having a conjugated structure and a substance capable of forming an alloy with an alkali metal or a substance in which an alkali metal ion can be inserted.

Further, a non-aqueous secondary battery comprising a conductive polymer film formed on the counter-electrode-confronting surface of a fusible alloy negative electrode is disclosed in Japanese Unexamined Patent Publication No. 62-140358, and a non-aqueous electrolyte secondary battery comprising a negative electrode having lithium adsorbed in a negative electrode-constituting body composed of a mixture of a metal capable of forming an alloy with lithium or a lithium alloy powder with powdery graphite is disclosed in Japanese Unexamined Patent Publication No. 62-226536.

Many reports have been made on a alkali metal battery comprising a positive electrode composed of an inorganic oxide or inorganic calcogenide capable of absorbing and releasing an alkali metal ion upon charging and discharging, and an electrochemical intercalation of sodium to sodium-cobalt oxide is reported by Calude Delmas et al. in the Journal of Solid State Chemistry, 6, pages 532–537 (1973) or by Claude Delmas et al. in Solid State Ionics, 3–4, pages 165–169 (1981). In these references concerning sodium-cobalt oxide, it is stated that, when various oxides having different crystal structures are electrochemically oxidized or reduced, the crystal structures are changed by the quantity of the sodium ion according to the degree of oxidation, and that among these crystal structures, the P2 phase in which the oxygen arrangement is prismatic does not undergo a structural charge over a broad range of the sodium ion quantity. Accordingly, it is suggested that if this phase is used for an electrode, the theoretical energy density is highest.

An example in which a battery is fabricated by using sodium-cobalt oxide for the positive electrode is disclosed in Japanese Unexamined Patent Publication No. 61-245474, and in this example, a mixture of a powdery $NaPb_{0.26}Sn_{0.74}$ alloy, poly-p-phenylene and a polypropylene binder is used for the negative electrode.

Various electrolytes for the alkali metal battery have been proposed. As the solvent, propylene carbonate (PC), dimethylsulfoxide (DMSO), dimethylformamide (DMF), tetrahydrofuran (THF), 2-methyltetrahydrofuran (MTHF) and 1,3-dioxolan (DOL), as proposed in the Journal of Power Source, 12, pages 83–144 (1984), are often used. Organic solvents and electrolytic substances are described in detail on pages 30 through 44 of Basic Electrochemical Measurement Methods compiled by the Association of Electrochemistry. A battery in which a mixture of a polyethylene glycol dialkyl ether and propylene carbonate is used as the solvent for improving storage characteristics of a lithium battery is disclosed in Japanese Unexamined Patent Publication No. 62-29070. Before this patent publication, in the Journal of Power Sources, 12, pages 53–59 (1984), Shinichi Tobishima and Akihiko Yamaki reported a mixed solvent having a good conductivity and utilizing a solvation effect, which comprises propylene carbonate and diglyme, triglyme or tetraglyme.

Nevertheless, practical batteries comparable to existing lead-acid batteries or nickel-cadmium batteries have not been developed from the foregoing proposals, and the problems of the batteries proposed in the foregoing literature and patent references inhibit a practical utilization thereof. The problems, etc., are summarized and shown by Junichi Yamamoto in Electrochemistry, 56, No. 1, pages 5–8 (1988) and Zenichiro Takehara in Chemical Industries, January 1988, pages 52–56.

A room temperature-operating secondary battery using an alkali metal for the negative electrode has the problems described above, and none of the batteries of this type is as marketable as a general-purpose secondary battery, although a lithium type secondary battery having a very small capacity (1 mAh to 3 mAh) has been marketed in very small quantities. Moli Energy Limited Co., Canada, marketed a secondary battery having a relatively large capacity (higher than 600 mAh) using $MoS_2$ for the positive electrode, an Li foil for the negative electrode and an $LiAsF_6$ type electrolyte, but this secondary battery was inferior to a nickel-cadmium battery of the same shape in reversability of the charging-discharging cycle, high-speed charging and discharging characteristic, and overdischarge characteristic, although the energy density was improved. Namely, this secondary battery has no general-purpose utility.

The causes of the difficulty of practical application are now under investigation, to clarify the problems of the conventional techniques. The problems involved in the use of an alkali metal element, especially lithium as the negative electrode, are due to the high activity of lithium per se. Namely, lithium has a very high reactivity with other substances, and the lithium surface always reacts with the electrolyte and impurities contained therein during storage, charging, and discharging of the battery. Accordingly, the electrode surface is partially or entirely covered with an insulating film acting as a resistance to the battery reaction, and the charging and discharging efficiencies are reduced. Moreover, during charging a dentrite inevitably grows to form a short circuit to the counterelectrode, and the life of the battery is shortened.

To overcome the above-mentioned problems arising when lithium element is used as the negative electrode, the lithium surface must be covered with a uniform ionic conductive film and the charging current density must be maintained at a low level at which the formation of a dentrite can be controlled. But, even if such means is adopted and the battery is operated under such conditions, every time charging-discharging is repeated, a new lithium surface is formed, and since this reaction does not participate in the charging and discharging, lithium is wastefully consumed, which is one reason why the life of the battery cannot be prolonged.

On the other hand, where sodium element is used as the negative electrode, since the ionization potential is higher by about 0.3 V than that of lithium, the reaction with the electrolyte is controlled to some extent, but the problems are not substantially different from those arising when lithium element is used. Moreover, since the reactivity with water or other is higher than that of lithium, handling is difficult and a practical utilization thereof is impossible.

Accordingly, if an alkali metal element is used directly as the negative electrode, a secondary battery having a good performance cannot be formed, and thus the use of an alkali metal alloy has been attempted as an excellent method for moderating the high activity of an alkali metal and appropriately controlling the battery reaction.

For example, as described in detail in J. Electrochem, Soc., 118, No. 10, pages 1547–1549 (1971), Journal of Power Sources, 12, pages 83–144 (1984), B. M. L. Rao, R. W. Francis and H. A. Christopher, J. Electrochem. Soc., 124, No. 10, pages 1490–1492, and J. R. Owen and W. C. Maskell, Solid State Ionics, 13, pages 329–334 (1984), the use of alloys of lithium with aluminum, tin, lead, magnesium, or zinc has been proposed. Among these alloys, a lithium/aluminum alloy is considered most excellent because the diffusion speed of lithium is highest in aluminum. The most important reason for using the alloy instead of the alkali metal element is that, as pointed out hereinbefore, the activity of the alkali metal is reduced to control the reaction with the solvent and impurities and the formation of a dentrite by this reaction is prevented. If the alloy is used, the electrodeposition potential of the alkali metal can be shifted to the noble side and the underpotential of electrodeposition can be utilized. For example, an alloy comprising lithium and aluminum at an atomic ratio of 1/1 has a potential nobler by 0.3 to 0.4 V than that of a lithium element. Accordingly, the reaction with a solvent which is readily reduced and decomposed or a substance with readily reacts with the lithium metal element can be controlled. In general, the formation of a dentrite is conspicuous when the current density at electrodeposition is high or the potential is low. This problem is substantially solved if the alloy is used.

Nevertheless, the problems arising when lithium is used as the electrode are not completely solved even if the alloy is used; some problems remain and new problems arise. Namely, even if the potential is shifted by 0.3 to 0.4 V to the noble side by using the alloy, the reaction with the solvent or impurities is not substantially inhibited.

For example, propylene carbonate, which is an organic solvent used relatively frequently, is thermodynamically decomposed even at a potential nobler by at least 0.4 V than that of lithium, and it is known that in the case of an ether type solvent, the reaction of which with lithium is relatively mild, impurities contained therein cannot be completely removed and the solvent reacts gradually with lithium because of the instability thereof. Moreover, the alloy is different from the lithium element in that the alloy electrode is thinned as charging-discharging is repeated, and finally, it becomes impossible to maintain the electrode form and the electrode is broken to shorten the life of the battery. Moreover, since the alloy is used, to obtain an electric capacity density comparable to that attained by lithium element, the electrode must hold an excessive additional portion, i.e., a mating metal to be alloyed with lithium, and the utilization of lithium in the alloy at every charging-discharging cycle must be considerably increased.

An alkali metal secondary battery comprising a lithium alloy or sodium alloy alone as the electrode active substance and having an increased alkali metal utilization ratio, a large capacity, and a good cycle life has not been practically marketed.

As the means for improving the utilization ratio of the lithium negative electrode, that is, the electric capacity density, a process in which the surface area of the electrode is increased by mixing the lithium element or a lithium alloy with a carbon material, as described hereinbefore, is disclosed in Japanese Examined Patent Publication No. 48-14264, and Japanese Examined Patent Publication No. 62-140358, and a process in which the surface of lithium or a lithium alloy is treated or covered with a carbon material is disclosed in Japanese Unexamined Patent Publication No. 59-157973. Indeed, it carbon black or other materials having a specific surface area are dispersed in the negative electrode the substantial effective area of the negative electrode is increased, but, the activity is increased and occurrence of side reactions with the electrolyte and the like becomes frequent. Practically, carbon black or the others cannot be used as the electrode active substance, and if only the electrode surface is covered with a carbon material, an effect of improving the charging-discharging efficiency or maintaining the performance cannot be obtained.

Attempts to use, as the electrode active substance, a composite body comprising a conductive polymer having a conjugated double bond in the main chain instead of the above-mentioned carbon material, and an alkali metal or alkali metal alloy are disclosed in Japanese Unexamined Patent Publication No. 60-26351, Japanese Unexamined Patent Publication No. 61-245474, and Japanese Unexamined Patent Publication No. 62-140358. Where lithium or a lithium alloy is used, as described above with respect to the composite material with the carbon material, the surface area of the electrode can be increased but side reactions are undesirably promoted.

In connection with the above-mentioned attempts, only when the alkali metal alloy is a sodium alloy, i.e., only when the sodium alloy disclosed in Japanese Unexamined Patent Publication No. 61-245474 is used, improvements are effectively obtained and it is possible to elevate the electric capacity density of the negative electrode to a practical level. This is because since the reactivity of the sodium metal alloy is milder than that of lithium, the lithium alloy or sodium, if an appropriate electrolyte is selected, almost all of the side reactions can be controlled, and is the sodium metal alloy is combined with a conductive polymer, the effective surface area can be increased without a promotion of side reactions.

The conductive polymer per se has an inherent low electrical conductivity and the conductive polymer is electrically insulating form the viewpoint of the battery reaction unless it is doped with an alkali metal or another dopant. Accordingly, if an undoped conductive polymer is merely dispersed in the electrode, only a liquid-retaining effect is attained in the electrode. This doping is naturally effected when the composite body is immersed in the electrolyte, because of the potential difference between the conductive polymer and the alkali metal alloy, but the speed is low. Doping an undoping occur according to the potential of the negative electrode at charging and discharging of the battery, but the conductive polymer is not always uniformly doped. Therefore, the conductive polymer must be doped with an alkali metal before it is formed into the composite body. Whether doping may be carried out electrochemically or chemically, a burden is imposed on the industrial utilization thereof and this preliminary doping is not preferable from the economical viewpoint. Furthermore, as pointed out hereinbefore, if the doped conductive polymer is used for formation of the composite body, since a part of the alkali metal ion that should inherently act as the active substance for charging and discharging is caught by the conductive polymer, an excess of the alkali metal ion becomes necessary, and thus the capacity density of the electrode is reduced. The doping quantity of the conductive polymer changes according to the electrode potential, and if the doping quantity is small, the electric conductivity is reduced. Accordingly, when the doped conductive polymer is used for the electrode of the battery, the range of the effective electrode potential by the doped conductive polymer as the constituent of the composite material is narrowed and the range of the utilizable battery voltage is much restricted.

Fabrication of a high-performance battery having a high energy density and a long cycle life is not attainable only by improvements of the constituents of the negative electrode. Note, these improvements must be combined with an appropriate positive electrode material and an appropriate electrolyte. For example, where $TiS_2$ or $MoS_2$ is used as the positive electrode material, the obtainable battery voltage is 2.5 V at highest, whether the lithium type active substance or the sodium type active substance may be used for the negative electrode, and a high-performance battery having a high energy density cannot be provided.

The use of sodium-cobalt oxide as the positive electrode material was proposed, for example, in the Journal of Solid State Chemistry, 6, pages 532–537 (1973), and an excellent positive electrode was provided. But, at that time, a negative electrode material effective for the reaction of inserting and releasing sodium ions had not been developed and an electrolyte for a battery was not investigated. Therefore, this positive electrode was evaluated only by using a propylene carbonate solvent not suitable for the sodium type negative electrode, and a battery comprising this positive electrode has not been developed.

Where propylene carbonate or ethylene carbonate is used alone or in the form of a mixture with another solvent as the solvent of the electrolyte, if the negative electrode is composed of metallic lithium having a smooth surface, the surface area is small, the amount of the reaction product with the solvent is small and the reaction product can act as a protecting film. However, this solvent reacts violently with an alkali metal negative electrode having a specific surface area increased for forming a high-capacity type battery, and the solvent cannot be used in this case. Therefore, an appropriate solvent must be developed. But, in the lithium metal composite negative electrode, solvent having a sufficient electric conductivity and stable to the positive electrode has not been developed.

In short, the foregoing, problems are unsolved even now, and an alkali metal secondary battery having a high energy density and a long cycle life, and capable of being industrially produced at a low cost, has not been developed.

SUMMARY OF THE INVENTION

With a view to solving the foregoing problems, the inventors have now found an excellent combination of battery active substance constituents.

More specifically, in accordance with the present invention, there is provided a secondary battery comprising a positive electrode, a negative electrode and a non-aqueous electrolyte, wherein the positive electrode comprises a sodium-cobalt oxide as the main component, the negative electrodes is composed of a composite body comprising a sodium alloy, a carbon material and a binder, and the non-aqueous electrolyte is composed of a sodium salt and an ether compound.

DESCRIPTION OF THE PREFERRED EMBODIMENTS

Figure 1:
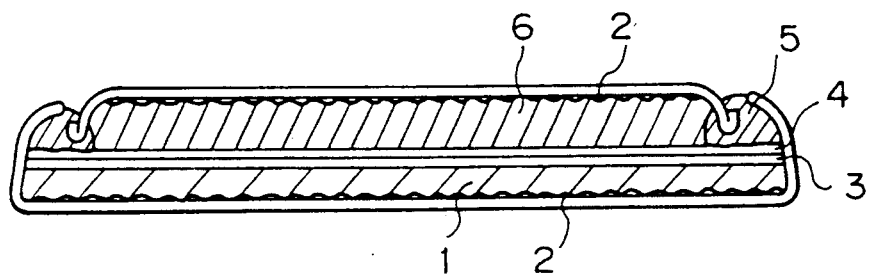
FIG. 1 is a sectional view illustrating a coin-type battery.

In the secondary battery of the present invention having a positive electrode comprised of sodium-cobalt oxide, the oxidation-reduction potential of the sodium-cobalt oxide is within an appropriate range as compared with the oxidation-reduction potential of sodium, and is about 3 V (practically, the potential is in the range of from 2 to 4 V according to the quantity of sodium in the sodium-cobalt oxide), and the sodium-cobalt oxide electrochemically absorbs and releases sodium ions with a good reversability. Accordingly, the electric capacity density based on the active substance is high. The sodium-cobalt oxide per se has a high electric conductivity and use of a conducting agent is not substantially necessary. Only when the bulk density of the electrode is controlled, is the impregnation quantity of the electrolyte adjusted and the area of the interface between the electrode and electrolyte is increased, and thus the conducting agent must be used.

Carbon black is suitable as the conducting agent, and preferably, the conducting agent is added together with the binder so that the amount of carbon black in the electrode is not larger than 7% by weight and the amount of the binder is not larger than 6% by weight. In this case, an electrode having a good flexibility can be obtained from the composition, charging and discharging can be performed at a high speed, and the electric capacity density per volume of the electrode can be increased. Where another positive electrode material having a low electric conductivity, for example, $\gamma$-type $MnO_2$, is used for the electrode, if the contact with the conducting agent is reduced by deformation of the electrode caused by charging and discharging, especially if deep discharging is carried out, subsequent charging and discharging cannot be performed smoothly, and a reduction of the efficiency occurs and the life of the electrode is shortened. In contrast, in the case of the sodium-cobalt oxide, since the electric conductivity is high, no problem arises even if the volume of the active substance is changed by deep discharging. Furthermore, the entire electrode participates smoothly in the electrode reaction and the electrode is operated at a high efficiency. Of the crystal structures of sodium-cobalt oxide, the $\gamma$-type structure is most suitable for the battery electrode, and this structure is shown as the P2 phase in Journal of Solid State Chemistry, 6, pages 532–537 (1973). In sodium-cobalt oxide having the $\gamma$-type structure, the crystal structure is not changed over a broad range of the sodium content even if sodium ions are electrochemically absorbed and released, and thus this structure has an excellent reversibility.

Nevertheless, a good battery cannot be fabricated only by using this electrode as the positive electrode, and an appropriate negative electrode and an appropriate electrolyte are necessary as good mates.

Accordingly, the present inventors searched for a constituent material having a good performance as the negative electrode active substance, and found a sodium alloy composite body having excellent characteristics not possessed by a lithium alloy composite body.

Sodium can form alloys with many metals, and of these alloys, a sodium/lead alloy and a sodium/tin alloy are excellent as the electrode material, because the mating metal, that is, lead or tin, can form an alloy over a broad range of the atomic ratio of sodium. More specifically, in the case of sodium/lead, alloys can be formed over a sodium/lead atomic ratio range of from 95/5 to 2/98, and in the case of sodium/tin, alloys can be formed over a sodium/tin atomic ratio range of from about 100/0 to 5/95. Furthermore, where an alloy of sodium with at least one metal selected from lead and tin is used as the electrode, the atomic ratio of sodium to the mating metal can be set according to the intended electrode potential, and conversely, the electrode potential is set by the atomic ratio. Therefore, the composition can be electrochemically controlled very easily. Moreover in these two alloys, the composition ratio between sodium and the mating metal changes greatly within a narrow potential range of, for example, about 0.5 V. Accordingly, when the alloys are used as the electrode, an good potential uniformity can be maintained over a broad range of the electric capacity at either charging or discharging.

However, as pointed out hereinbefore, simple use of a sodium alloy as the electrode is not advantageous. To utilize the sodium alloy practically satisfactorily, voids capable of retaining an appropriate amount of the electrolyte must be formed in the electrode and the interface area between the active substance in the electrode and the electrolyte must be increased so that the electrode reaction can be performed at a high speed without the application of a substantial overvoltage. In this case, the entire electrode can participate uniformly in the electrode reaction and local overchanging or discharging can be controlled, and high-speed charging and discharging can be conducted while controlling the formation of a dentrite. The material capable of increasing the area of the interface between the active substance in the electrode and the electrolyte as much as possible and appropriately controlling the bulk density of the electrode which is stable to the electrode, is a carbon material such as carbon black or graphite. Since the carbon material has a high electric conductivity, the carbon material also acts as a conducting assistant for promptly advancing the electrode reaction. Furthermore, the carbon material is very stable to the electrolyte and the like. Carbon black has a very large specific surface area and a high void ratio. Graphite shows a specific elastic deformation, though the specific surface area is smaller than that of carbon black. Accordingly, if graphite is incorporated in the electrode, deformation such as swelling and shrinkage by the electrode reaction of the electrode active substance can be controlled and the electrode shape can be maintained. Moreover, swelling deformation by permeation of the electrolyte or the like can be controlled to a low level.

The kind and preparation process of the carbon material used for the formation of the composite body are not particularly limited, and any carbon material can be used regardless of the kind and preparation process. For example, natural graphite, artificial graphite, and thermally cracked graphite prepared by the gas-phase method can be used as the graphite, and acetylene black, thermal black, furnace black, and activated carbon can be used as the carbon black. But, from the viewpoint of the electric capacity density, preferably a carbon material showing a highest effect with an amount as small as possible is used. In this case, preferably carbon black is alone used as the carbon material in combination with a binder to the desired electrode shape. Furthermore, where a certain electric capacity is required and the reversability is important, preferably carbon black having a large specific surface area and acetylene black having a smaller specific surface area are used in combination, a graphite fiber or carbon fiber is used or a mixture of carbon black and graphite is used, and molding is carried out by using a binder to obtain the desired electrode shape. In short, any carbon material can be used regardless of the kind and preparation process, and a carbon material can be used either singly or in the form of a mixture of two or more thereof.

The binder as one constituent of the negative electrode is preferably capable of sufficiently providing the intended electrode shape with use of a small amount, and, in general, the binder used has no reactivity with the electrode and the electrolyte. Usually, a fiber or powder of polyethylene or polypropylene is used in the state where the fiber or powder is sufficiently dispersed in the electrode and is then heated and fused. The inventors have found that an olefin copolymer rubber, such as ethylene/propylene rubber (EPR), ethylene/butene rubber (EBR) or ethylene/propylene/diene rubber (EPDM), is most effective as the binder for the negative electrode material, and EPDM is especially preferred. EPDM is stable to the solvent used, i.e., an ether compound, and EPDM has a strong adhesion and the amount necessary for obtaining a sufficient electrode strength can be reduced to less than ½ of the amount of polyethylene or polypropylene.

To complete a high-performance secondary battery, an electrolyte which is stable to both the electrodes and has a high electric conductivity is necessary, even though preferred constituents and shapes of the positive and negative electrodes are set. As pointed out hereinbefore, carbonates having a high polarity, such as propylene carbonate, cannot be used, and the electrolyte having a good stability to both the positive and negative electrodes and a high electric conductivity is a system formed by dissolving an Na salt, especially $NaPF_6$ or $NaBF_4$, in an ether compound.

Various ether compounds can be used as the battery solvent, which include, for example, 1,2-dimethoxyethane, 1,1-dimethoxyethane, tetrahydrofuran, 2-methyltetrahydrofuran, 1,3-dioxolan, 4-methyl-1,3-dioxolan, anisole, trifluoromethylanisole, dioxane and polyethylene glycol dialkyl ethers. In view of the stability and the electric conductivity in the form of the electrolyte, polyglycol dialkyl ethers represented by the following formula (1) and mixtures thereof are preferred as the solvent;

$$R^1-O-(C_mH_{2m}O)_n-R^2 \qquad (1)$$

wherein $R^1$ and $R^2$ independently stand for an alkyl group having 1 to 8 carbon atoms, n is an integer of from 1 to 8, and m is 2 or 3.

The electrolyte having a high electric conductivity at room temperature and a good stability is obtained by dissolving $NaPF_6$ or $NaBF_4$ in 1,2-dimethoxyethane. As a simple system having a relatively good electric conductivity even at a low temperature, for example, a temperature lower than $-20°$ C., having a vapor pressure controlled to a level lower than that of 1,2-dimethoxyethane along, and easy to handle, a system formed by dissolving $NaPF_6$ or $NaBF_4$ in diethylene glycol dimethyl ether or 1-ethoxy-2-methoxyethane and a system formed by dissolving $NaPF_6$ or $NaBF_4$ in a mixed solvent comprising 1,2-dimethoxyethane and a polyglycol dialkyl ether represented by the formula (1) are especially preferred. A mixed solvent of 1,2-dimethoxy ethane with triethylene glycol dimethyl ether, triethylene glycol diethyl ether, tetraethylene glycol dimethyl ether, tetraethylene glycol diethyl ether, dipropylene glycol dimethyl ether, tripropylene glycol dimethyl ether, diethylene glycol dimethyl ether, or 1-ethoxy-2-methoxyethane is especially preferred. Of these, a mixed solvent of 1,2-dimethoxyethane with tetraethylene glycol dimethyl ether is most preferred. It was found that if an ether compound as mentioned above is mixed into 1,2-dimethoxyethane at a volume ratio of from 2/1 to 1/20, the low-temperature characteristics are especially greatly improved. Data of the electrical conductivity at room temperature and $-20°$ C. are shown in Table 1.

TABLE 1

| Electrolyte | Electric conductivity (mS/cm) | |
|---|---|---|
| | 24° C. | −20° C. |
| 1M $NaPF_6$/TrEGDME | — | — |
| 1M $NaPF_6$/TrEGDME + DME (1:1) | 5.8 | 0.6 |
| 1M $NaPF_6$/TrEGDME + DME (1:3) | 9.8 | 5.1 |
| 1M $NaPF_6$/TrEGDME + DME (1:5.8) | 10.9 | 5.7 |
| 1M $NaPF_6$/TrEGDME + DME (1:9) | 10.8 | 5.3 |
| 1M $NaPF_6$/TeEGDME + DME (1:3) | 9.8 | 5.3 |
| 1M $NaPF_6$/TeEGDME + DME (1:9) | 12.1 | 6.2 |
| 1M $NaPF_6$/TrEGDME + DME (1:19) | 13.2 | 4.8 |
| 1M $NaPF_6$/TeEGDEE + DME (1:3) | 8.6 | 4.6 |

TABLE 1-continued

| Electrolyte | Electric conductivity (mS/cm) | |
| --- | --- | --- |
| | 24° C. | −20° C. |
| 1M NaPF$_6$/TeEGDEE + DME (1:9) | 11.5 | 4.1 |
| 1M NaPF$_6$/TeEGDEE + DME (1:19) | 12.6 | 2.9 |
| 1M NaPF$_6$/DME | 15.2 | 0.9 |

Note
DME: 1,2-dimethoxyethane
TrEGDME: triethylene glycol dimethyl ether
TeEGDME: tetraethylene glycol dimethyl ether
TeEGDEE: tetraethylene glycol diethyl ether Optimum ratios of constituents of the positive and negative electrodes and the preparation process will now be described.

Sodium-cobalt oxide having a γ-type structure is preferred as the active substance of the positive electrode, and sodium-cobalt oxide having at least 70% by weight of the γ-type structure is especially preferred. This is because the structure is electrochemically stable over a broad range of the sodium content in the γ-type sodium-cobalt oxide. The sodium/cobalt atomic ratio is not particularly limited when the oxide is used, but good results are obtained when the oxide is synthesized at a sodium/cobalt atomic ratio of from 0.65/1.0 to 0.90/1.0. Synthesis of γ-type sodium-cobalt oxide is accomplished according to the process disclosed in the Journal of Solid State Chemistry, 6, pages 532-537 (1973). When molding the electrode, the addition of a conducting assistant is not indispensable because sodium-cobalt oxide has a good electric conductivity. In the case of a coin-shaped or plate-shaped electrode, since it is not necessary to wind or deform the electrode after molding, softness is not required. Therefore, the function of the electrode can be sufficiently maintained only by compression-molding powdery sodium-cobalt oxide into a pellet, a plate or the like. In the case of a cylinder-shaped battery, although the sodium-cobalt oxide has a certain binding property, since a high softness is required at the step of setting the electrode at a cylinder can, a high softness is often required. Accordingly, it is sometimes necessary to impart a softness by the binder. But, where the binder is used, since the binder has an electric insulating property, if the binder is merely incorporated in the powder of sodium-cobalt oxide, the function of the active substance is reduced. Therefore, carbon black having a liquid impregnating property must be used in combination therewith. On the contrary, when the bulk density of the electrode is controlled by an addition of carbon black, it is necessary to add the binder, regardless of the electrode shape.

As the binder, a fluorocarbon resin such as polytetrafluoroethylene or an olefin copolymer rubber such EPDM is preferred. This is because this binder is stable within the normal operation voltage range of the electrode and shows a high bonding effect, and this binder can provide an electrode having the desired shape and a good softness with a small amount thereof. But, if the binder and carbon black are incorporated in too an large amount, the electric capacity density is degraded. Preferably, carbon black is incorporated in an amount not larger than 7% by weight and the binder is incorporated in an amount not larger than 6% by weight.

Where the binder is used, if the surface of the sodium-cobalt oxide is covered with the binder, as pointed out hereinbefore, the electrode activity is reduced. Accordingly, for the formation of the electrode, a process is preferably adopted in which the binder is first swollen with or dissolved in an organic solvent, carbon black is incorporated into the binder, the mixture is mixed with sodium-cobalt oxide directly or after removal of the organic solvent from the mixture, and the mixture is then molded into a desired electrode shape. As the solvent for swelling and dissolving the binder, cyclohexane, benzene, xylene, and toluene are preferred.

Preferably, the bulk density of the positive electrode exclusive of a collector is 2.3 to 3.5 g/cm$^3$.

In the battery of the present invention, the negative electrode must be composed of a composite body comprising a sodium alloy, a carbon material and a binder. To attain a high electrode performance at a high efficiency, preferably the composite body comprises at least 80% by weight of the sodium alloy, 3 to 20% by weight of the carbon material and 1 to 8% by weight of the binder. If this composition is not satisfied, the electrode performance is degraded. For example, if the amount of the sodium alloy is smaller than 80% by weight, the electric capacity density is not satisfactory, and if the amount of the carbon material is smaller than 3% by weight, it is impossible to appropriately control the bulk density of the electrode and such disadvantages as breaking, formation of a dentrite and reduction of the electrode utilization ratio occur at early cycles. If the amount of the carbon material exceeds 20% by weight, the bulk density is reduced and the strength of the electrode is degraded, and disadvantages occur in connection with the electric capacity density and cycle characteristics. If the amount of the binder is smaller than 1% by weight, a sufficient electrode strength cannot be obtained and breaking occurs at early cycles. If the amount of the binder exceeds 8% by weight, the resistance in the electrode becomes excessive and the electrode reaction is not smoothly advanced, and thus a large electric capacity cannot be produced.

Preferably, the bulk density of the negative electrode exclusive of an collector is 1.7 to 2.5 g/cm$^3$.

The negative electrode is preferably prepared by a process similar to the above-mentioned process for the preparation of the positive electrode. More specifically, a process can be adopted in which the binder is swollen with or dissolved in an organic solvent, carbon black, optionally with powdery graphite, is thoroughly mixed with the binder, the mixture is mixed with the sodium alloy powder directly or after removal of the solvent from the mixture, and the mixture is then molded into a desired electrode shape, although the preparation process is not limited to this process. A fiber or powder of polyethylene or polypropylene can be used as the binder, but EPDM (ethylene/propylene rubber) is most preferred because a high binding effect is attained with a small amount and the reactivity with the electrode or electrolyte is low. As the solvent for the binder, cyclohexane, benzene, xylene and toluene are preferred.

By combining the above-mentioned positive electrode, negative electrode and electrolytes, a battery having high-performance characteristics not attainable by a single use thereof or a combined use thereof with other substances can be prepared at a low cost.

The secondary battery of the present invention will now be described in detail with reference to the following examples that by no means limit the scope of the invention.

EXAMPLE 1

In a mortar, 8.2 g of sodium peroxide ($Na_2O_2$) and 24.1 g of cobalt oxide ($Co_3O_4$) were pulverized and mixed, and were stirred for several minutes by a high-speed stirring mixer. The mixture was transferred into an electric furnace, the temperature was gradually elevated in the air atmosphere, and the mixture was calcined at 550° C. for 2 hours. Then the mixture was elevated to 740° C. and the calcined product was maintained at this temperature for 15 hours to synthesize sodium-cobalt oxide. When the naturally cooled synthesized product was analyzed by X-ray diffractometry, it was confirmed that the synthesized product was composed substantially completely of $\gamma$-type sodium-cobalt oxide. When the Na/Co atomic ratio of the synthesized product was determined by the ICP emission method, it was found that the Na/Co atomic ratio was 0.705/1.00.

The synthesized product was thoroughly pulverized to obtain a powder having a diameter smaller than 100 mesh, and 250 mg of the powder was weighed and sampled and molded to a diameter of 15 mm by a tablet-molding machine so that a stainless steel expanded metal collector was included in the tablet. The electrode thickness was adjusted so that the bulk density of the electrode exclusive of the expanded metal was 3.1 g/cm$^3$. The thus-prepared electrode was used as the positive electrode.

The negative electrode was prepared in the following manner. First, sodium and lead were allowed at a sodium/lead atomic ratio of 2.7/1.0 in an argon gas atmosphere furnace, and the alloy was transferred in a globe box maintained in an argon atmosphere, where the contents of water and oxygen were controlled to lower than several ppm, and the alloy was pulverized by using a stainless steel mortar and a stainless steel rod to reduce the particle diameter to less than 100 mesh. Carbon black (Black Pearl ® 2000 supplied by Showa-Cabot) was washed with acetone and ethyl alcohol and heat-treated at 500° C. under a reduced pressure. Then, 10.2 g of the so-treated carbon black was added to 2.5 g of EPDM (JSR-EP579 supplied by Japan Synthetic Rubber) dissolved in xylene maintained at 60° C., and the mixture was thoroughly stirred and then dried at 80° C. under a reduced pressure for 1 hour to remove xylene. Then, 10.0 g of the obtained mixture and 67.0 g of the above-mentioned alloy powder were weighed and thoroughly mixed by using a mortar and a rod, and were mixed together again by a high-speed stirring mixer. Then, 130 mg of the mixture was weighed and sampled and then molded into a tablet having a diameter of 15 mm by a tablet-molding machine so that a nickel expanded metal collector was included in the tablet. The thickness of the tablet was adjusted so that the bulk density of the electrode exclusive of the expanded metal was 2.1 g/cm$^2$.

The thus-prepared electrode was used as the negative electrode. The Na alloy/carbon black/EPDM weight ratio was 87/10.4/2.6.

An electrolyte prepared by recrystallizing $NaPF_6$ three times from 1,2-dimethoxyethane, drying the sodium salt at 60° C. under a reduced pressure, dissolving the dried sodium salt in 1,2-dimethoxymethane refined by distillation at a concentration of 1.0 mole/l, and removing minute amounts of impurities by sodium amalgam was used as the electrolyte.

The above-mentioned constituents were assembled into a coin-type cell having a diameter of 20 mm and a thickness of 1.6 mm, as shown in FIG. 1, in the following manner.

The negative electrode 6 preliminarily impregnated with the electrolyte was set together with an expanded metal collector 2 within a vessel, and a microporous polypropylene film 4 preliminarily impregnated with the electrolyte and a polypropylene non-woven fabric 3 were placed on the negative electrode 6, and the positive electrode 1 preliminarily impregnated with the positive electrode was further placed thereon together with an expanded metal collector 2. Then, the electrolyte was supplied from above so that the system was thoroughly impregnated with the electrolyte. Then, the vessel was covered with a top lid and the vessel was caulked by a caulker, whereby a battery was assembled. Reference numeral 5 represents an insulating packing.

The voltage of the battery just after assembling was 2.50 V. When discharging was conducted at a current value of 2.5 mA in the discharge direction, the quantity of electricity discharged before reduction of the battery voltage to 1.70 V was 10.6 mAh. After the discharging, an open circuit was formed for 30 minutes to rest the battery. Then, charging was carried out at a constant current value of 2.5 mA until the battery voltage was elevated to 3.2 V.

After termination of the charging, the battery was rested for 30 minutes and discharging was carried out at the same current value until the battery voltage was reduced to 1.7 V. The charging-discharging cycle test was thus carried out continuously while resting for 30 minutes after each charging and discharging, whereby the discharge capacity and the cycle life were examined. After termination of charging of the 25th cycle, an open circuit was formed, the battery was allowed to stand at 25° C. for 1 month, and the discharge capacity was examined under the same conditions as adopted at the cycle test to check the self-discharge rate. After this self-discharge test, the cycle test was then carried out.

Figure 2:
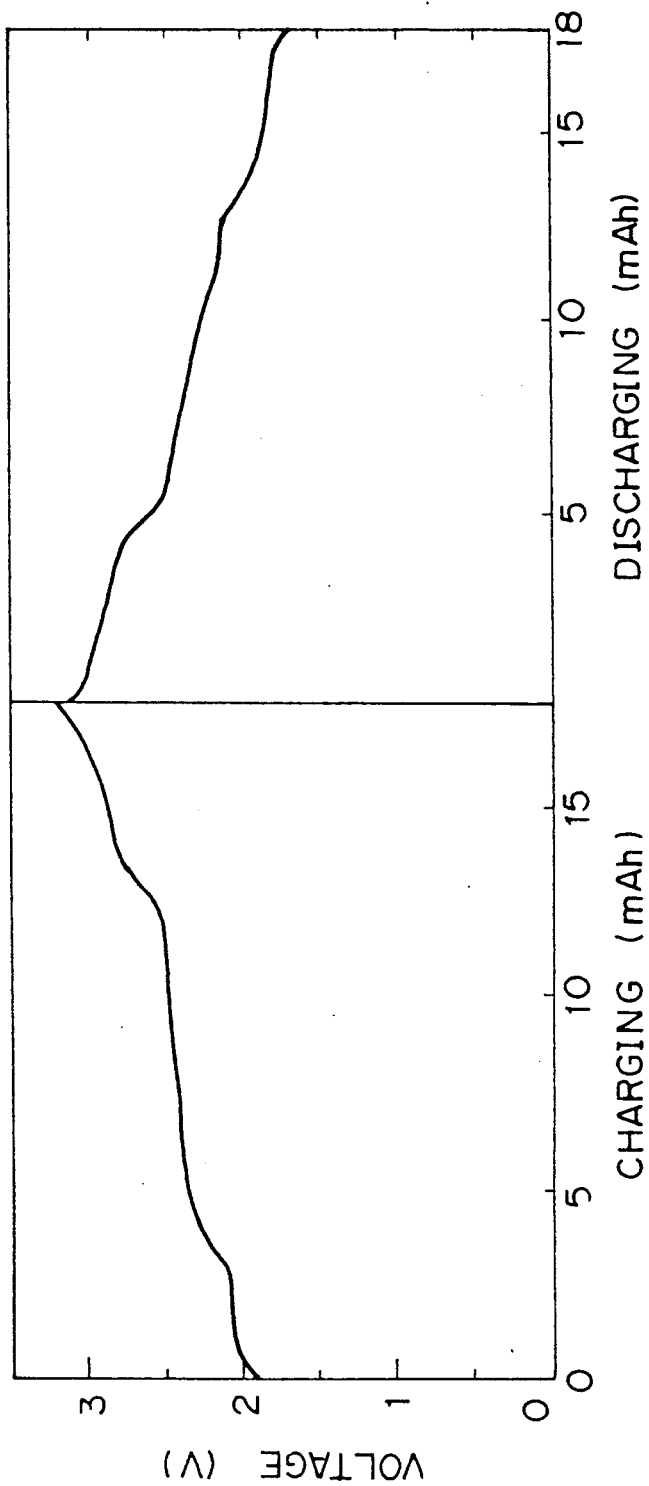
FIG. 2 is a diagram illustrating the change of the voltage at charging and discharging of the 5th cycle in the battery obtained in Example 1.
Figure 3:
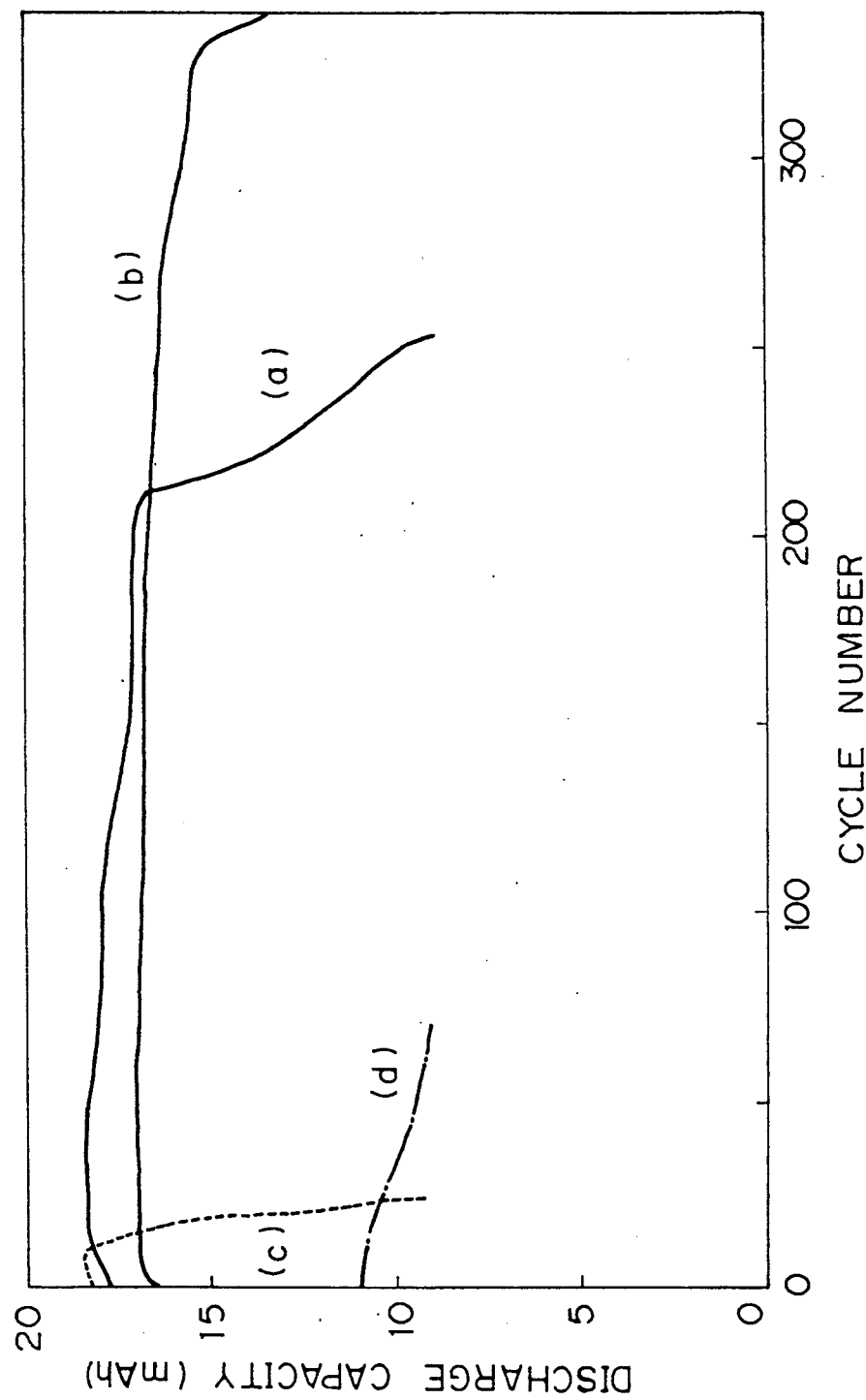
FIG. 3 is a diagram illustrating the relationship between each cycle and the discharge capacity at the charging-discharging cycle test.

The change of the voltage at charging and discharging of the fifth cycle was as shown in FIG. 2, and the discharge capacity was 18.0 mAh. The relationship between each cycle and the discharge capacity was as shown in FIG. 3-(a), the maximum discharge capacity was 19.0 mAh, and the cycle life for reduction of the discharge capacity to ½ was 252 cycles. The self-discharge rate of this battery at 25° C. for 1 month was 3.2%.

EXAMPLE 2

In a mortar, 14.8 g of sodium carbonate ($Na_2Co_3$) and 26.8 g of cobalt oxide ($Co_3O_4$) were thoroughly pulverized and mixed and were further mixed for several minutes by a high-speed stirring furnace. The mixture was transferred into an electric furnace, the temperature was elevated at a rate of 3° C./min to 750° C. in an oxygen atmosphere, and this mixture was maintained at this temperature for 15 hours to synthesize sodium-cobalt oxide. When the naturally cooled synthesized product was analyzed by the X-ray diffractometry, it was confirmed that the synthesized product was composed mainly of $\gamma$-type sodium-cobalt oxide while a small amount of a component deemed to be $\beta$-type sodium-cobalt oxide was present. From the diffraction peak ratio, it was presumed that the synthesized product comprises 3% of the $\beta$-type oxide and 97% of the $\gamma$-type oxide. When the Na/Co ratio was determined by the ICP emission method, it was found that the Na/Co ratio was 0.82. The synthesized product was thoroughly pulverized to a powder having a size smaller than 100 mesh, and 195 mg of the powder was weighed and molded into a tablet having a diameter of 15 mm by a tablet-molding machine so that a stainless steel expanded metal collector was included in the tablet. The thickness of the electrode was adjusted so that the bulk density of the electrode exclusive of the expanded metal was 3.1 g/cm$^3$. The thus-prepared electrode was used as the positive electrode.

The negative electrode was prepared in the following manner.

Sodium and lead were alloyed at an atomic ratio of 2.25/1.0 in an argon gas atmosphere furnace, and the formed alloy was transferred into a globe box in an argon atmosphere and was thoroughly pulverized to a diameter not larger than 100 mesh by a stainless steel mortar and a stainless steel rod.

Separately 2.5 g of the same EPDM as used in Example 1 was dissolved in 50 cc of xylene heated at 60° C., and the same carbon black of Showa-Cabot as used in Example 1 and graphite powder supplied by Showa Denko, which were washed with acetone and ethyl alcohol and heat-treated at 500° C. under a reduced pressure, were added in amounts of 6.5 g and 3.5 g, respectively, into the above solution and the mixture was thoroughly stirred. Then, the mixture was dried at 80° C. under a reduced pressure for 1 hour to remove xylene. When cyclohexane, benzene or toluene was used as the solvent for EPDM instead of xylene, the formed solution can be similarly used, although the amount necessary for dissolving EPDM homogeneously differed. It was found that, among these hydrocarbon solvents, xylene and cyclohexane were preferred as the solvent capable of dissolving EPDM homogeneously with a small amount, and xylene was especially preferred.

Then, 10 g of the dried mixture and 68.0 g of the above-mentioned alloy powder were weighed and thoroughly mixed by using a mortar and a rod, and 160 mg of the mixture was taken and molded into a tablet having a diameter of 15 mm by a tablet-molding machine so that a nickel expanded metal collector was included in the tablet.

The thickness of the electrode was adjusted so that the bulk density of the electrode exclusive of the expanded metal was 2.2 g/cm$^3$. The thus-prepared electrode was used as the negative electrode. In this negative electrode, the sodium alloy/carbon material/EPDM weight ratio was 87.2/10.3/2.6. The same electrolyte as used in Example 1 was used.

In the same manner as described in Example 1, a coin-type cell as shown in FIG. 1 was assembled.

The voltage of the battery just after the preparation was 2.48 V. When discharging was effected at a current value of 2.5 mA in the discharge direction, the quantity of electricity discharged before a reduction of the battery voltage to 1.70 V was 10.3 mAh.

A resting time of 30 minutes was allowed after the termination of discharging, and charging was conducted at the same current value until the battery voltage was elevated to 3.7 V.

After the termination of charging, a resting time of 30 minutes was allowed, and discharging was conducted until the battery voltage was reduced to 1.7 V. Then, charging and discharging were repeated in the same manner and at the 50th cycle, the self-discharge rate was measured.

Figure 4:
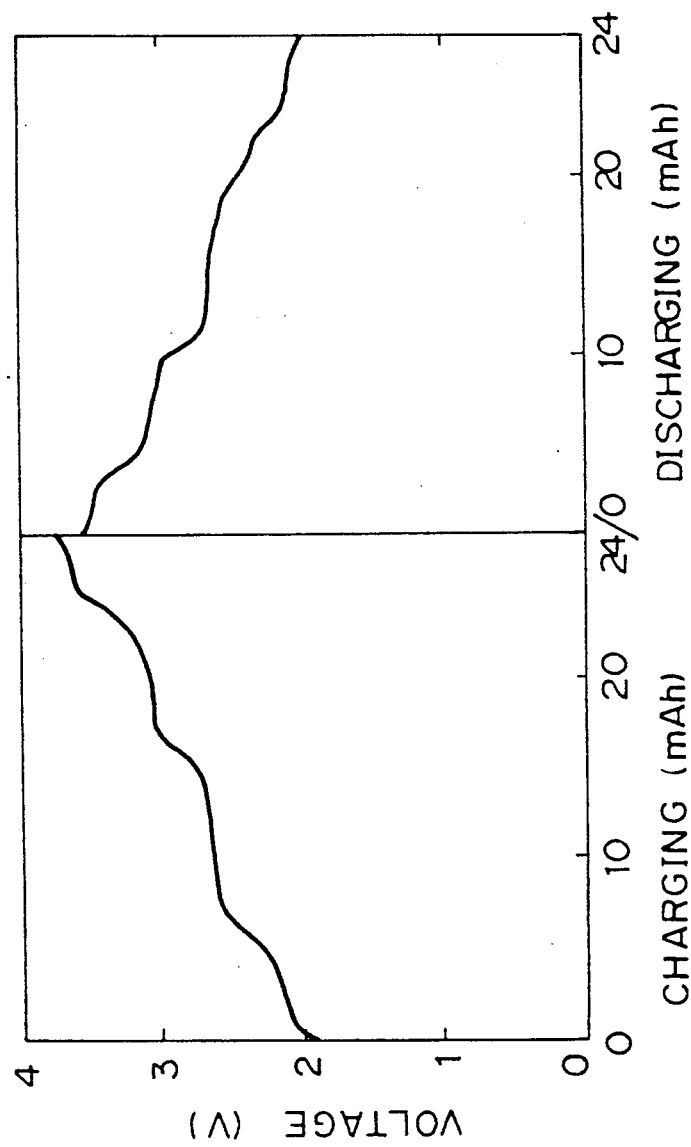
FIG. 4 is a diagram illustrating the change of the voltage at charging and discharging of the 5th cycle in the battery obtained in Example 2.
Figure 5:
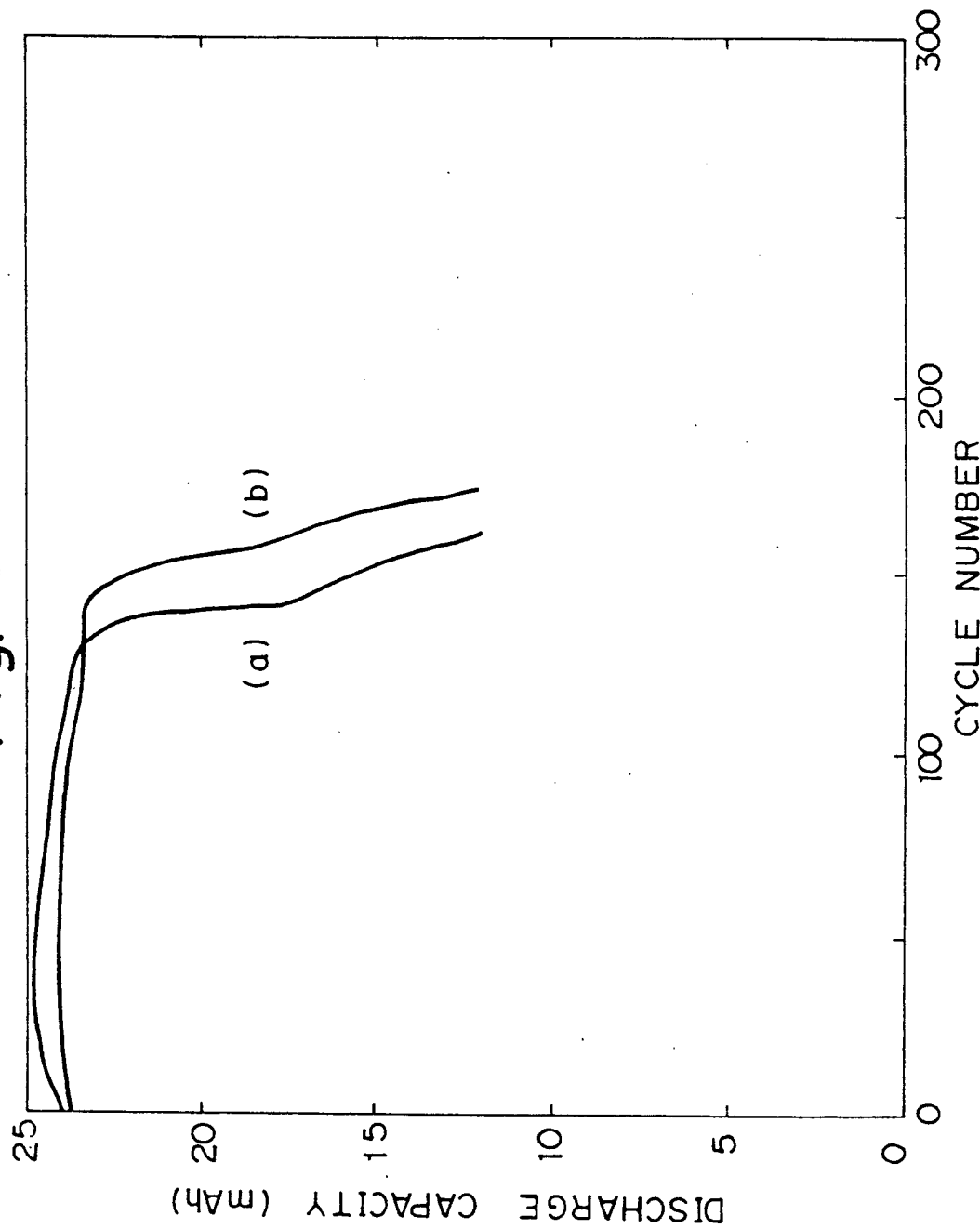
FIG. 5 is a diagram illustrating the relationship between each cycle and the discharge capacity at the charging-discharging cycle test.

At the above-mentioned test, the change of the voltage at charging and discharging at the 5th cycle was as shown in FIG. 4, and the discharge capacity was 24.0 mAh. The relation between each cycle and the discharge capacity was as shown in FIG. 5-($a$). The maximum discharge capacity was 24.7 mAh, and the cycle life for reduction of the capacity to ½ was 162 cycles. The self-discharge rate at 25° C. for 1 month was 4.9%.

EXAMPLE 3

Sodium-cobalt oxide having a $\tau$-type structure content of about 100% was synthesized from the same starting materials in the same manner as described in Example 1. The synthesized product was sufficiently pulverized to obtain a powder having a diameter not larger than 100 mesh.

Separately, the same carbon black and EPDM as used in Example 1 were dissolved in amounts of 6 g and 2 g, respectively, in hot xylene, and the mixture was thoroughly stirred and dried under a reduced pressure to remove xylene. Then, 0.400 g of the mixture of carbon black and EPDM was added to 9.600 g of the powder of sodium-cobalt oxide and were mixed by a high-speed stirring mixture. Then, 230 mg of the mixture was weighted and molded to a tablet having a diameter of 15 mm by a tablet-molding machine so that an expanded metal collector was included in the tablet.

The thickness of the electrode was adjusted so that the bulk density of the electrode exclusive of the expanded metal was 2.9 g/cm$^3$. The thus-prepared electrode was used as the positive electrode.

The negative electrode was prepared in the following manner.

A sodium/lead alloy prepared in the same manner as described in Example 1 was mixed with a mixture of carbon black (Sho-Black ® N110 supplied by Showa-Cabot) and EPDM (JSR-EP25X supplied by Japan Synthetic Rubber) dissolved in xylene so that the sodium alloy/carbon black/EPDM weight ratio was 88/9.5/2.5.

Then, 125 mg of this mixture was weighted and molded into a tablet having a diameter of 15 mm by a tablet-molding machine so that a nickel expanded metal collector was included in the tablet. The thickness of the electrode was adjusted so that the bulk density of the electrode exclusive of the expanded metal was 2.1 g/cm$^3$. The thus-prepared electrode was used as the negative electrode. The same electrolyte as used in Example 1 was used.

A coin-type cell was assembled in the same manner as described in Example 1. The voltage of the battery just after assembly was 2.51 V. The quantity of electricity discharged before reduction of the battery voltage to 1.70 V was 10.2 mAh when discharging was conducted at a current value of 2.5 mA in the discharge direction of the battery. After the termination of discharging, a resting time of 30 minutes was allowed, and charging was conducted at the same current value until the voltage was elevated to 3.2 V. After the termination of charging, a resting time of 30 minutes was allowed, and discharging was conducted at the same current value. Then, the performance test of the battery was carried out under the same conditions as described in Example 1.

The relationship between each cycle and the discharge capacity was as shown in FIG. 3-($b$), and the maximum discharge capacity was 17.1 mAh and the cycle life for reduction of the capacity to ½ was 258 cycles. The self-discharge rate of the battery at 25° C. for 1 month was 3.0%.

EXAMPLE 4

A positive electrode was prepared in the same manner as described in Example 3 except that the weight of the electrode was changed to 182 mg, and a negative electrode was prepared in the same manner as described in Example 2 except that the weight of the electrode was changed to 160 mg. A solution of $NaBF_4$ having a concentration of 1 mole/l in DME was used as the electrolyte.

By using these electrodes and electrolyte, a coin-type cell as shown in FIG. 1 was assembled. The performance test of the battery was carried out in the same manner as described in Example 2. The relationship between each cycle and the discharge capacity was as shown in FIG. 5-(b), and the maximum discharge capacity was 24.0 mAh and the cycle life was 173 cycles. The self-discharge rate of the battery at 25° C. for 1 month was 4.5%.

EXAMPLE 5

A sodium-cobalt oxide powder prepared in the same manner as described in Example 1 was mixed with polytetrafluoroethylene supplied by Daikin Kogyo, which was dispersed in cyclohexane as the solvent, and carbon black, so that the sodium-cobalt oxide/polytetrafluoroethylene/carbon black weight ratio was 95/5.5/2.5. The mixture was dried under a reduced pressure, and 215 mg of the dried mixture was molded into an electrode having a diameter of 15 mm so that the bulk density of the electrode exclusive of a collector was 2.70 $g/cm^3$. The thus-prepared electrode was used as the positive electrode.

The same negative electrode and electrolyte as used in Example 1 were used. A coin-type cell as shown in FIG. 1 was assembled and the performance of this battery was examined. The voltage of the battery just after assembly was 2.51 V. When discharging was conducted at a constant electric current value of 2.5 mA in the discharge direction of the battery until the battery voltage was reduced to 1.80 V, the quantity of electricity that could be discharged was 8.5 mAh. After a resting time of 30 minutes, charging was conducted at the same current value until the voltage was elevated to 2.75 V. A resting time of 30 minutes was then allowed, and discharging was conducted at the same current value until the voltage was reduced to 1.80 V. Thus, the charging-discharging repetition test was carried out. Furthermore, at the 25th cycle, the battery was allowed to stand in an open circuit at 25° C. for 1 month, and the self-discharge rate was checked.

Figure 6:
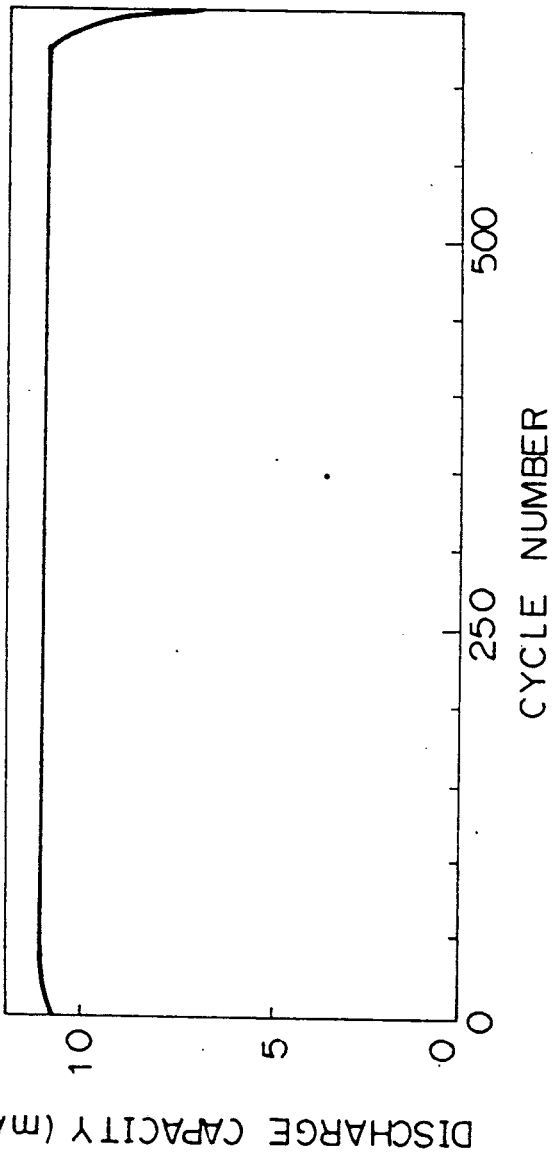
FIG. 6 is a diagram illustrating the relationship between each cycle and the discharge capacity at the cycle test of the battery obtained in Example 5.

The relationship between each cycle and the discharge capacity was as shown in FIG. 6. The maximum discharge quantity was 11.0 mAh, and the cycle life for reduction of the discharge capacity to 7 mAh was 699 cycles. The self-discharge rate of this battery at 25° C. for 1 month was 2.5%.

EXAMPLE 6

Figure 7:
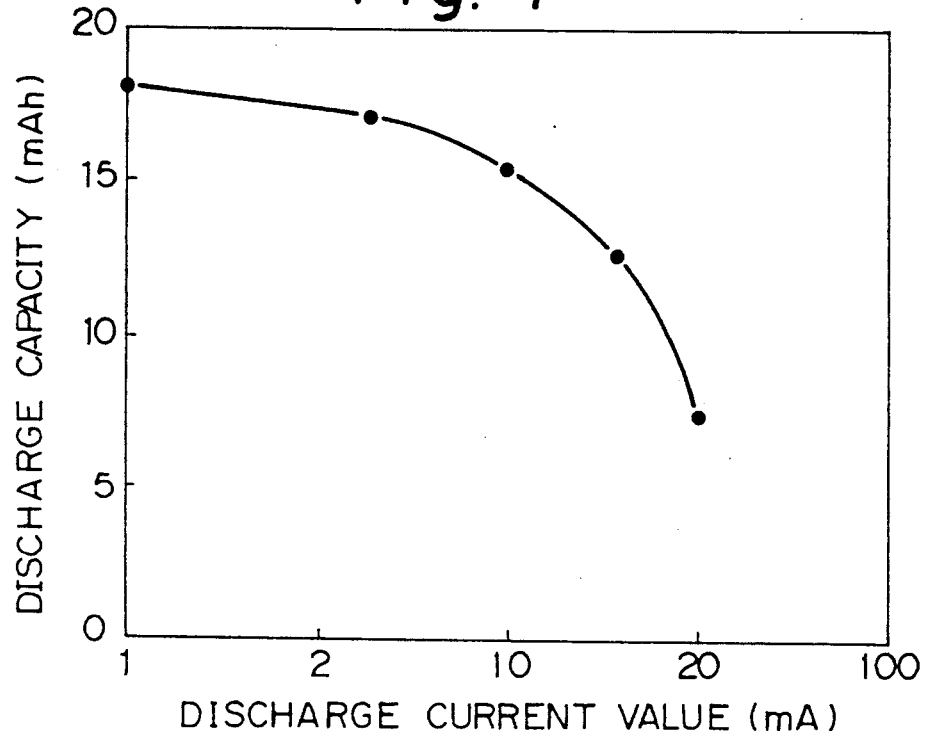
FIG. 7 is a diagram illustrating the relationship between the discharging current value and the discharge capacity in the battery obtained in Example 6.

The same battery as described in Example 3 was assembled, and the charging-discharging test was carried out in the following manner. At the 10th cycle where the discharge capacity became stable, the discharge current value was changed to 5 mA from 2.5 mA adopted at the preceding cycles, and at the 12th cycle, the discharge current value was changed to 10 mA. At the 14th cycle, the discharge current value was changed to 15 mA and at the 16th cycle, the discharge current value was changed to 20 mA, and at the 18th and 19th cycles, the discharge current value was changed to 1 mA. A constant charge current value of 2.5 mA was adopted at each cycle. The relationship between the discharge current value and the discharge capacity was determined, and it was found that, assuming that the discharge capacity obtained at 2.5 mA was 100%, the discharge capacity attained at 10 mA was 90%. Accordingly, it was confirmed that the battery was suitable for high-speed discharging. The results are shown in FIG. 7.

EXAMPLE 7

The same battery as described in Example 3 was assembled, and the charging-discharging test was carried out in the following manner. At the 10th cycle, where the discharge capacity became stable, the charge current value was changed to 5 mA from 2.5 mA adopted at the preceding cycles, and at the 12th cycle, the charge current value was changed to 10 mA. At the 14th cycle, the charge current value was changed to 15 mA and at the 16th cycle, the charge current value was changed to 20 mA. At the 18th and 19th cycles, the charge current value was changed to 1 mA. A constant discharge current value of 2.5 mA was adopted at each cycle. The relationship between the charge current value and the discharge capacity was examined.

Figure 8:
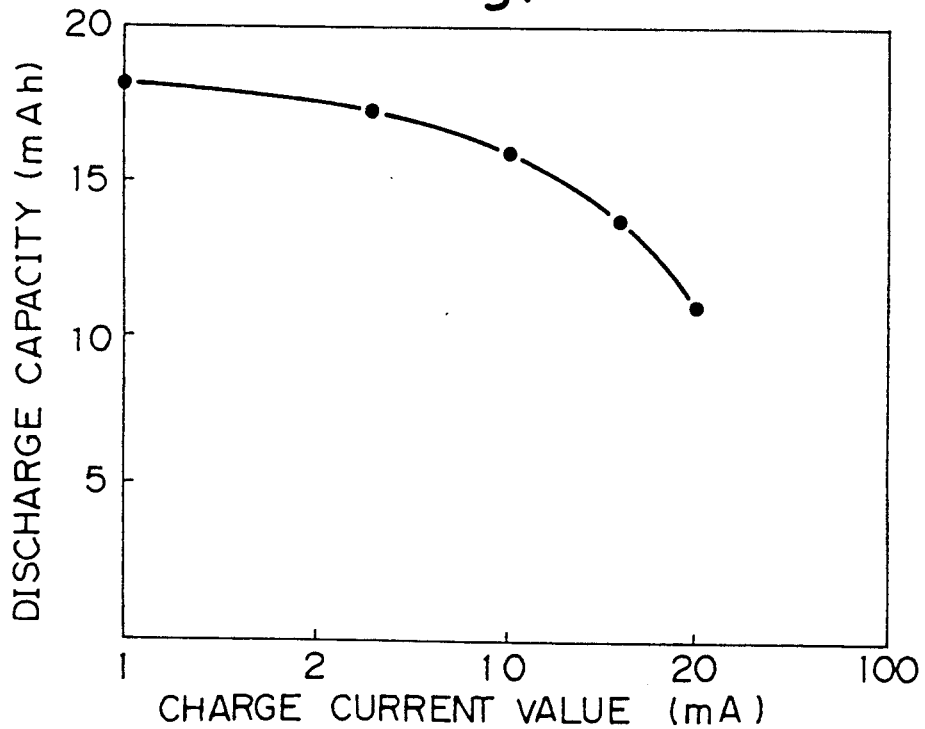
FIG. 8 is a diagram illustrating the relationship between the charging current value and the discharge capacity in the battery obtained in Example 7.

It was found that, assuming that the discharge capacity attained when charging was conducted at a current value of 2.5 mA was 100%, the discharge capacity attained when charging was conducted at a current value of 15 mA was 80%, and it was confirmed that the battery was suitable for high-speed charging. The results are shown in FIG. 8.

EXAMPLE 8

Figure 9:
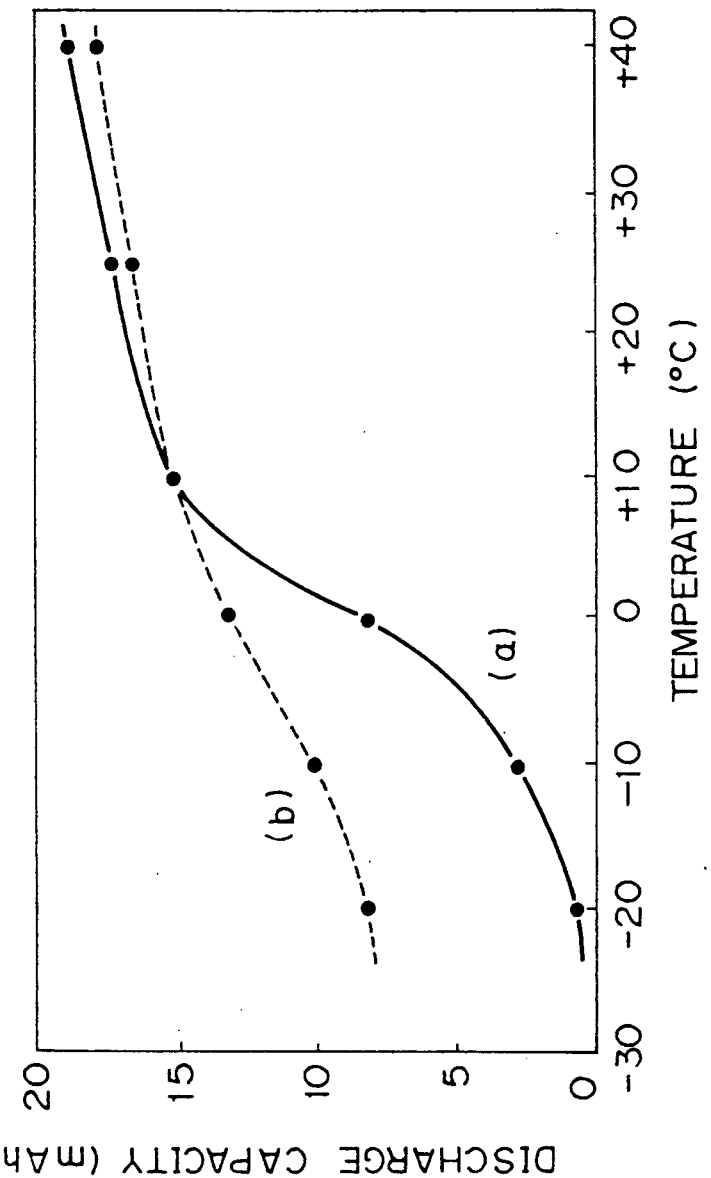
FIG. 9 is a diagram illustrating the relationship between the temperature and the discharge capacity at the time of discharging.

The same battery as described in Example 3 was assembled. After termination of charging at the 10th cycle where the discharge capacity became stable, discharging was carried out at a current value of 2.5 mA at various temperatures until the voltage was reduced to 1.7 V. Charging was carried out at room temperature. The results were as shown in FIG. 9-(a). In the system using the electrolyte formed by dissolving $NaPF_6$ at a concentration of 1 mole/l in DME, the discharge capacity at a low temperature was smaller than the discharge capacity at room temperature.

EXAMPLE 9

A battery was assembled in the same manner as described in Example 3 except that an electrolyte formed by dissolving $NaPF_6$ at a concentration of 1 mole/l in a mixed solvent comprising DME and tetraethylene glycol dimethyl ether at a volume of 3/1 was used instead of the electrolyte used in Example 3.

The charging-discharging repetition test and self-discharging test of the battery were carried out in the same manner as described in Example 3. It was found that the maximum discharge capacity was 16.4 mAh and the cycle life for reduction of the capacity to ½ was 422 cycles. The self-discharge rate of the battery at 25° C. for 1 month was 2.4%.

EXAMPLE 10

The same battery as described in Example 9 was assembled, and the temperature dependency of the discharge capacity was examined under the same experimental conditions as described in Example 8. The results are shown in FIG. 9-(b). As seen from FIG. 9-(b), even at a low temperature (−20° C.), the discharge quantity was larger than 50% of the discharge quantity attained at room temperature.

EXAMPLES 11 through 20

In the battery system described in Example 3, the kind of the solvent of the electrolyte was changed, and the maximum discharge capacity at room temperature (25° C.), the cycle life, the self-discharge rate and the discharge capacity at a low temperature (−2° C.) were determined. The results are shown in Table 2. The voltage cut range was from 1.7 to 3.2 V, the current value was 2.5 mA, and the self-discharge test was carried out at 25° C. for 1 month.

found that the maximum discharge capacity was 16.1 mAh, the cycle life was 299 cycles, and the self-discharge rate was 3.8%.

EXAMPLE 22

A positive electrode was prepared in the same manner as described in Example 3 except that the sodium-cobalt oxide/carbon black/EPDM mixing weight ratio was changed to 86/10/4, the electrode weight was changed to 200 mg and the bulk density was changed to 2.0 g/cm$^3$. A negative electrode was prepared in the same manner as described in Example 3 except that the electrode weight was changed to 100 mg. A battery was assembled by using these positive and negative electrode in the same manner as described in Example 3.

Since the bulk density of the positive electrode of this battery was low, the amounts of the active substances

TABLE 2

| Example No. | Solvent (volume ratio) | Room temperature (25° C.) | | | Low temperature (−20° C.) Discharge capacity (mAh) |
|---|---|---|---|---|---|
| | | Maximum discharge capacity (mAh) | Cycle number | Self-discharge ratio (%) | |
| 11 | Tetraethylene glycol dimethyl ether | 4.2 | 527 | 2.7 | 2.0 |
| 12 | Tetraethylene glycol diethyl ether | 4.1 | 529 | 2.5 | 2.1 |
| 13 | Tetraethylene glycol diethyl ether: 1,2-dimethoxyethane (1:5) | 16.0 | 396 | 2.6 | 8.8 |
| 14 | Triethylene glycol dimethyl ether: 1,2-dimethoxyethane (1:5) | 16.3 | 369 | 2.9 | 8.2 |
| 15 | Triethylene glycol dimethyl ether: 1,2-dimethoxyethane (1:9) | 16.2 | 347 | 3.1 | 8.2 |
| 16 | Tripropylene glycol dimethyl ether: 1,2-dimethoxyethane (1:5) | 14.8 | 298 | 3.5 | 7.1 |
| 17 | Dipropylene glycol dimethyl ether: 1,2-dimethoxyethane (1:1) | 14.3 | 290 | 4.2 | 7.0 |
| 18 | Pentaethylene glycol dimethyl ether: 1,2-dimethoxyethane (1:9) | 15.7 | 271 | 4.1 | 7.2 |
| 19 | Octaethylene glycol dimethyl ether: 1,2-dimethoxyethane (1:9) | 15.0 | 348 | 3.0 | 7.0 |
| 20 | Tetraethylene glycol dimethyl ether: 1,2-dimethoxyethane (1:9) | 16.8 | 425 | 2.8 | 8.1 |

EXAMPLE 21

The same positive electrode and electrolyte as described in Example 1 were used. The negative electrode was prepared in the following manner.

In an argon gas atmosphere furnace, an alloy comprising sodium and tin at an atomic ratio of 2.5/1.0 was thoroughly pulverized to a particle diameter smaller than 100 mesh. The same carbon black and EPDM as used in Example 1 were added to the pulverized alloy so that the content of the alloy was 88% by weight, the carbon black content was 9.5% by weight and the EPDM content was 2.5% by weight. According to the same mixing and molding methods as adopted in Example 1, 80 mg of an electrode was prepared so that the bulk density of the electrode was 1.3 g/cm$^3$. The thus-prepared electrode was used as the negative electrode.

A coin-type cell as shown in FIG. 1 was assembled, and the electrode performance test was carried out in the same manner as described in Example 1. It was were smaller than in the battery of Example 3. The performance test of this battery was carried out in the same manner as described in Example 3. It was found that the maximum discharge capacity was 11.9 mAh, the cycle life was 362 cycles, and the self-discharge rate was 3.5%.

EXAMPLE 23

A negative electrode was prepared in the same manner as described in Example 3 except that the alloy/carbon black/EPDM mixing weight ratio was changed to 80/16/4. A positive electrode having the same composition as described in Example 3 was used. A coin-type cell as shown in FIG. 1 was molded while adjusting the weights of the active substances in the positive and negative electrodes in view of the electric capacity. In the obtained battery, the weight of the positive electrode was 210 mg and the weight of the negative electrode was 105 mg.

Since the bulk density of the negative electrode of this battery was 1.5 g/cm³ and was as low as in the battery of Example 22, the amounts of the active substances includes in this coin battery were smaller than in Example 3.

EXAMPLE 24

The same chemicals as used in Example 1 were used. At first, 8.0 g of sodium peroxide and 24.7 g of cobalt oxide were weighed, and were thoroughly mixed by pulverization in a mortar, and the mixture was stirred for several minutes by a high-speed stirring mixer. A part of the mixture was molded into a pellet by a tablet-molding machine, and the pellet was finely pulverized again and compression-molded into a pellet. The pellet was pulverized and molded into a pellet again, the formed pellet was dried in an electric furnace, and the temperature was gradually elevated in the air. Calcination was conducted at 550° C. for 10 hours. Then, the calcination product was naturally cooled to obtain sodium-cobalt oxide. When the product was analyzed by the X-ray diffractometry, it was confirmed that the product was β-type sodium-cobalt oxide. When the Na/Co atomic ratio was determined by the ICP emission method, it was found that the Na/Co atomic ratio was 0.669/1.00.

This synthesized product was thoroughly pulverized to obtain a powder having a diameter smaller than 100 mesh. In the same manner as described in Example 3, 0.400 g of the mixture of carbon black and EPDM was mixed into 9.600 g of the sodium-cobalt oxide powder, and 230 mg of the mixture was weighed and molded into a tablet having a diameter of 15 mm and including a stainless steel expanded metal collector by a tablet-molding machine so that the bulk density of the electrode exclusive of the expanded metal was 2.9 g/cm³. A coin-type battery was assembled by using the thus-prepared electrode as the positive electrode and the same negative electrode and electrolyte as used in Example 3. The voltage of the battery just after the preparation was 2.62 V.

The performance test of the battery was carried out in the same manner as described in Example 3.

The maximum discharge capacity was 17.1 mAh and was the same as that of the battery obtained in Example 3, but the cycle life for reduction of the discharge capacity of ½ was short and 143 cycles. The self-discharge rate of the battery at 25° C. for 1 month was 3.5%.

EXAMPLE 25

Sodium-cobalt oxide was synthesized by the same chemicals by the same method as described in Example 1. The synthesized product was thoroughly pulverized to form a powder having a diameter smaller than 100 mesh.

Polytetrafluoroethylene was swollen with hot xylene, carbon black in an amount two times the amount of polytetrafluoroethylene was added to the swollen polytetrafluoroethylene, and were thoroughly mixed. Xylene was removed by drying, and the residual mixture was thoroughly mixed with the above-mentioned sodium-cobalt oxide so that the content of the sodium-cobalt oxide was 92% by weight and the content of the mixture was 8% by weight.

The mixture was placed on a metal foil of stainless steel in an amount of 68.8 mg/cm² of the unit area and was molded by a roll press to obtain an electrode having a width of 40 mm and a length of 268 mm. The electrode was folded so that the stainless steel foils were in contact with each other and the length was halved, and that the active substance was located on both sides of the collector in the electrode.

A negative electrode mixture having the same composition as described in Example 3 was placed on a metal foil of nickel in an amount of 31.5 mg/cm² of the unit area and was molded by a roll press to form an electrode having a width of 40 mm and a length of 302.5 mm.

This electrode was folded so that the nickel foils were in contact with each other and the length was halved, and that the active substance was located on both sides of the collector in the electrode.

A collecting terminal was taken out from the collecting foil at the center of each electrode, and both surfaces of the negative electrode were wrapped with two microporous films. The negative electrode was piled on the positive electrode, and they were wound so that the negative electrode was located on the outer side of the positive electrode, whereby a cylindrical electrode was constructed. The cylindrical electrode was inserted into a cylindrical can having an AA size i.e., an outer diameter of 14 mm and a height of 50 mm. A solution of NaPF₆ having a concentration of 1 mole/l in a mixed solvent comprising 1,2-dimethoxyethane and tetraethylene glycol diethyl ether at a volume ratio 6/1 was used as the electrolyte, and the electrolyte was poured into the can. The negative electrode side was connected to the can vessel and the positive electrode side was connected to the can lid, and the lid was capped on the can vessel and pressed thereto by a caulker, whereby a battery was assembled.

The voltage of the battery just after assembling was 2.52 V. Discharging was conducted at a constant current value of 100 mA in the discharge direction of the battery. The quantity of electrically discharged before reduction of the battery voltage to 1.7 V was 330 mAh. After a resting time of 30 minutes, charging was conducted at the same current value until the battery voltage was elevated to 3.2 V. After 30 minutes' resting, discharging was conducted and the charging-discharging repetition test was thus carried out. At the 5th cycle of this test, the discharge capacity was 554 mAh, and the maximum discharge capacity was 572 mAh and the cycle life for reduction of the electric capacity to ½ of the maximum discharge capacity was 209 cycles.

During this cycle test, at the 20th through 30th cycles, only the discharge temperature was changed to −20° C. and the capacity was examined. The minimum discharge capacity was 283 mAh and the maximum discharge capacity was 289 mAh. It was confirmed that a sufficient performance could be maintained even at a low temperature.

At the 25th cycle, discharging was carried out at −20° C. and a current value of 20 mA. It was found that a discharge quantity of 428 mAh was obtained.

EXAMPLE 26

The same chemical as used in Example 1 were used. At first, 7.5 g of Na₂O₂ and 30.8 g of Co₃O₄ were weighed and sodium-cobalt oxide was synthesized in the same manner as described in Example 1. From the results of the analysis, it was confirmed that the Na/Co atomic ratio was 0.5/1 and unreacted Co₃O₄ was left in the formed γ-type sodium-cobalt oxide. An electrode was molded by using this synthesized product in the same manner as described in Example 1.

By using the thus-prepared electrode as the positive electrode and the same negative electrode and electrolyte as used in Example 1, a coin-type cell was assembled in the same manner as described in Example 1. The voltage of the battery just after assembling was 2.58 V. The performance test was carried out in the same manner as described in Example 1. It was found that the maximum discharge capacity was as small as 12.5 mAh and the cycle life was as short as 123 cycles. At the 25th cycle, the self-discharge test was carried out. It was found that the self-discharge rate at 25° C. for 1 month was 3.7%.

EXAMPLE 27

The sodium-cobalt oxide prepared according to the method described in Example 1 was mixed with carbon black and EPDM in the same manner as described in Example 3 so that the sodium-cobalt oxide/carbon black/EPDM mixing weight ratio was 84/12/4. An electrode having a weight of 150 mg and a diameter of 15 mm was molded so that the bulk density of the electrode exclusive of the collector was 1.6 g/cm$^3$. The thus-prepared electrode was used as the positive electrode. A negative electrode having the same bulk density and composition as described in Example 3 was prepared in the same manner as described in Example 1 except that the weight was changed to 96 mg. The same electrolyte as used in Example 3 was used. A coin-type cell was assembled by using these positive electrode, negative electrode, and electrolyte.

The performance of the electrode was examined in the same manner as described in Example 3. It was found that the maximum discharge capacity was 9.6 mAh and the cycle life for reduction of the discharge capacity to ½ was 124 cycles. The self-discharge rate at 25° C. for 1 month was 3.9%.

EXAMPLE 28

A negative electrode was prepared in the same manner as described in Example 3 except that the Na$_{2.7}$Pb/carbon black/EPDM mixing weight ratio was adjusted to 74/20/6, the bulk density was changed to 1.30 g/cm$^3$ and the weight was changed to 90 mg. A positive electrode was prepared in the same manner as described in Example 3 except that the weight was changed to 178 mg. A coin-type cell was assembled in the same manner as described in Example 3 by using the thus-prepared positive and negative electrodes and the same electrolyte as used in Example 3.

The performance of the battery was examined in the same manner as described in Example 3. It was found that the maximum discharge capacity was 10.3 mAh and the cycle life for reduction of the discharge capacity to ½ was 112 cycles. The self-discharge rate at 25° C. for 1 month was 4.9%.

COMPARATIVE EXAMPLE 1

A negative electrode prepared in the following manner was used instead of the negative electrode used in Example 1.

An alloy comprising sodium and lead at an atomic ratio of 2.7/1.0 was placed in a glove box in an argon atmosphere in which the water and oxygen contents were reduced below several ppm, and the alloy was thoroughly pulverized to a particle diameter smaller than 100 mesh by using a stainless steel mortar and a stainless steel rod. Then, 200 mg was compressing-molded into a disc having a diameter of 15 mm and including a nickel expanded metal collector, and the thickness of the electrode was adjusted as in Example 1. The thus-prepared electrode was used as the negative electrode.

A coin-type battery was assembled in the same manner as described in Example 1 by using the thus-prepared negative electrode and the same positive electrode and electrolyte as used in Example 1. The voltage of the battery just after assembling was 2.15 V.

The performance test of the battery was carried out in the same manner as described in Example 1. The relationship between each cycle and the discharge capacity was as shown in FIG. 3-(c). The maximum discharge capacity was as large as 19.2 mAh, but the cycle life for reduction of the capacity to ½ was as short as 36 cycles. At the 25th cycle, the self-discharge test was carried out. The self-discharge rate of the battery at 25° C. for 1 month was 3.3%.

COMPARATIVE EXAMPLE 2

A negative electrode prepared in the following manner was used instead of the negative electrode used in Comparative Example 1. The sodium/lead alloy powder prepared in the same manner as described in Comparative Example 1 was mixed with EPDM dissolved in xylene so that the alloy/EPDM weight ratio was 99/1. A disc having a diameter of 15 mm was formed by adjusting the thickness as in Comparative Example 1. The thus-prepared electrode was used as the negative electrode.

By using the thus-prepared negative electrode and the same positive electrode and electrolyte as used in Comparative Example 1, a coin-type battery was assembled in the same manner as described in Comparative Example 1. The voltage of the battery just after assembling was 2.50 V.

The performance test of the battery was carried out in the same manner as described in Comparative Example 1. The relationship between each cycle and the discharge capacity was as shown in FIG. 3-(d). The maximum discharge capacity was 11.2 mAh and the cycle life for reduction of the discharge capacity to 9 mAh was 70 cycles. At the 25th cycle, the self-discharge rate of the battery was examined. It was found that the self-discharge rate was 3.2%.

EXAMPLE 29

Preparation of Negative Electrode

A high-purity sodium rod immersed in paraffin was taken out and the contaminated surface was shaved out. The sodium rod was mixed with an appropriate amount of granular lead (Na/Pb atomic ratio=3.75/1) and the mixture was fused at 500° C. for 3 hours in an electric furnace. Then, the temperature was lowered to 350° C. and annealing was conducted for 20 hours. The temperature of the alloy was returned to room temperature and the alloy was pulverized in a mortar. A predetermined amount of carbon black (Show-Black N110 supplied by Showa-Cabot) was thoroughly mixed with the pulverized alloy.

A predetermined amount of EPDM (JSR-EP57P) supplied by Japan Synthetic Rubber) dissolved in cyclohexane was mixed and thoroughly kneaded with the above-mentioned mixture. The above-mentioned predetermined amounts were such that the sodium alloy/carbon black/EPDM weight ratio was 87/10/3. The above-mentioned mixture was molded into a pellet-shaped negative electrode having a diameter of 15 mm and a thickness of 300 μm by a tablet-molding machine. The above operation was carried out in an argon gas atmosphere.

Battery Test

A coin-type battery as shown in FIG. 1 was assembled by using the negative electrode prepared in the above-mentioned manner, a positive electrode prepared by incorporating 10 parts of carbon black and 5 parts of polytetrafluoroethylene into $Na_{0.67}CoO_2$ prepared under heating from $Na_2O_2$ and $Co_3O_4$ and molding the mixture into a pellet, and a solution of 1 mole/l of $NaPF_6$ in 1,2-dimethoxyethane as the electrolyte. The battery test was carried out in the following manner.

Discharging was carried out at a constant current value of 3 mA in the discharge direction until the battery voltage was reduced to 1.7 V. After a resting time of 30 minutes, charging was carried out at a current value of 3 mA until the battery voltage was elevated to 3.3 V. After 30 minutes' resting, discharging was carried out again, and thus, the charging-discharging repetition test was carried out.

The maximum discharge quantity was 12.2 mAh and the cycle life for reduction of the discharge capacity to ½ was 320 cycles. At the 100th cycle and 200 cycles, the self-discharge rates at 25° C. for 30 days were 12.7% and 12.9%, respectively.

EXAMPLE 30

Preparation of Negative Electrode

A high-purity sodium lamp was mixed with granular lead at a sodium/lead atomic ratio of 3.75/1 and the mixture was fused at 500° C. for 4 hours, annealed at 350° C. for 15 hours and cooled to room temperature. The formed alloy was thoroughly pulverized in a mortar, and a predetermined amount of carbon black (Black Pearl ® 2000 supplied by Showa-Cabot) was incorporated into the pulverized alloy. Then, a predetermined amount of EPDM (SSR-EP57P supplied by Japan Synthetic Rubber) dissolved in xylene was kneaded in the above-mentioned mixture. The predetermined amounts were such that the sodium alloy/carbon black/EPDM weight ratio was 85/12/3.

Excessive xylene was removed under a reduced pressure from the above mixture, a nickel net having a mesh size of 75 mesh was placed as a reinforcer on the mixture, and the mixture was molded into a sheet having an overall thickness of 380 μm by a roll pressing method. The molded body was cut into a appropriate shape and the cut piece was used for the battery performance test. The above operation was carried out in an argon gas atmosphere.

Battery Test

A coin-type battery was assembled by using a disc having a diameter of about 15 mm, which was cut from the negative electrode prepared above, a positive electrode prepared by incorporating 5 parts of carbon black and 5 parts of polytetrafluoroethylene into $Na_{0.87}CoO_2$ prepared under heating from $Na_2O_2$ and $Co_3O_4$ and molding the mixture into a pellet, and a solution of 1 mole/l of $NaPF_6$ in 1,2-dimethoxyethane as the electrolyte.

The performance of the electrode was examined in the same manner as described in Example 29. The maximum discharge quantity was 12.4 mAh, and the cycle life for reduction of the discharge quantity below 10 mAh was 482 cycles. At the 100th cycle and 200th cycle, the self-discharge rate at 25° C. for 30 days were 12.2% and 12.5%, respectively.

EXAMPLE 31

Each of the same negative electrode and positive electrode as prepared in Example 30 was placed on a nickel net as the collector and molded into a sheet. A cylindrical battery cell of a AA size was prepared by using the thus-prepared positive and negative electrode sheets, two piled polypropylene non-woven fabrics as the separator and a solution of 1 mole/l of $NaPF_6$ in 1,2-dimethoxyethane as the electrolyte.

In this battery cell, discharging was conducted at a constant current value of 100 mA until the battery voltage was reduced to 1.7 V. After a resting time of 1 hour, charging was carried out at the same current value until the battery voltage was elevated to 3.3 V. After 1 hour's resting, discharging was carried out until the battery voltage was reduced to 1.7 V. The charging-discharging repetition test was thus conducted. The maximum discharge quantity was 390 mAh and the cycle life for reduction of the discharge capacity to 200 mAh was 245 cycles.

EXAMPLE 32

A high-purity sodium rod immersed in paraffin oil was taken out, the contaminated surface was shaved off, and the sodium rod was mixed with an appropriate amount of granular lead (the sodium/lead atomic ratio was 3.75/1). The mixture was fused at 500° C. for 3 hours in an electric furnace. Then, the temperature was lowered to 350° C. and annealing was carried out for 20 hours. The temperature of the alloy was returned to room temperature and the alloy was pulverized in a mortar. A predetermined amount of an artificial graphite powder (supplied by Showa Denko) was added to the pulverized alloy, and these were thoroughly mixed. A predetermined amount of EPDM (JSR-EP57P supplied by Japan Synthetic Rubber) dissolved in cyclohexane was mixed and sufficiently kneaded with the above mixture. The predetermined amounts were such that the sodium alloy/graphite powder/EPDM weight ratio was 82/15.3. A pellet-shaped negative electrode having a diameter of 15 mm and a thickness of 300 μm was molded from the above mixture by a tablet-molding machine. The foregoing operation was carried out in an argon gas atmosphere.

A coin-type battery as shown in FIG. 1 was assembled by using the thus-prepared negative electrode, a positive electrode prepared by incorporating 10 parts by carbon black and 5 parts of polytetrafluoroethylene in $Na_{0.67}CoO_2$ prepared under heating from $Na_2O_2$ and $CO_3O_4$ and molding the mixture into a pellet, and a solution of 1 mole/l of $NaPF_6$ in 1,2-dimethoxyethane as the electrolyte. The performance test of the battery was carried out in the following manner.

Discharging was carried out at a constant current value of 5 mA in the discharge direction until the voltage of the battery was reduced to 1.7 V. After a resting time of 30 minutes, charging was carried out at a current value of 5 mA until the voltage of the battery was elevated to 3.3 V. After a resting time of 30 minutes, discharging was carried out, and thus the charging-discharging test was conducted. The maximum discharge capacity was 12.2 mAh and the cycle life was 320 cycles. At the 100th cycle and 200th cycle, the self-discharge rates at 25° C. for 30 days were 10.5% and 11.2%, respectively.

EXAMPLE 33

A high-purity sodium lamp was mixed with granular lead so that the sodium/lead atomic ratio was 3.75/1, and the mixture was fused at 500° C. for 4 hours, annealed at 350° C. for 15 hours and then cooled to room temperature. The obtained alloy was thoroughly pulverized in a mortar, a predetermined amount of a powder of heat decomposition type graphite was incorporated in the pulverized alloy, and a predetermined amount of EPDM (JSR-EP57P supplied by Japan Synthetic Rubber) dissolved in xylene was mixed and then kneaded with the mixture. The predetermined amounts were such that the sodium alloy/graphite powder/EPDM weight ratio was 85/12/3.

Excessive xylene was removed under a reduced pressure from the mixture, and a nickel net having a mesh size of 75 mesh was placed on the mixture and a sheet was molded from the mixture by a roller pressing method so that the total thickness was 380 μm.

A disc having a diameter of about 15 mm was cut from the thus-prepared negative electrode sheet, and a coin-type battery as shown in FIG. 1 was assembled by using this disc as the negative electrode, a positive electrode prepared by incorporating 5 parts of carbon black and 5 parts of polytetrafluoroethylene into $Na_{0.67}CoO_2$ prepared under heating from $Na_2O_2$ and $Co_2O_4$ and molding the mixture into a pellet, and a solution of 1 mole/l of $NaPF_6$ in 1,2-dimethoxyethane as the electrolyte. The performance of the battery was examined.

The test was carried out in the same manner as described in Example 32. The maximum discharge quantity was 12.2 mAh and the cycle life for reduction of the discharge quantity below 10 mAh was 482 cycles. At the 100th cycle and 200th cycle, the self-discharge rates at 25° C. for 30 days were 10.3% and 11.0%, respectively.

EXAMPLE 34

A high-purity sodium lamp was mixed at high-purity granular tin so that the sodium/tin atomic ratio was 3.75/1. The mixture was fused at 500° C. for 4 hours, annealed at 340° C. for 15 hours and cooled to room temperature.

The thus-prepared alloy was thoroughly pulverized in a mortar, a predetermined amount of an artificial graphite powder supplied by Showa-Denko was incorporated into the pulverized alloy, and the predetermined amount of EPDM (JSR-EP25X supplied by Japan Synthetic Rubber) dissolved in xylene was kneaded into the mixture. The predetermined amounts were such that the sodium alloy/graphite powder/EPDM weight ratio was 82/14/4.

The mixture was molded into a pellet-shaped negative electrode having a diameter of 15 mm and a thickness of 300 μm by a tablet-molding machine.

A coin-type battery as shown in FIG. 1 was assembled by using the thus-prepared negative electrode, the same positive electrode as used in Example 1 and a solution of 1 mole/l of $NaPF_6$ in 1,2-dimethoxymethane as the electrolyte, and the battery test was conducted. The test method was the same as described in Example 1. The maximum discharge quantity was 11.5 mAh and the cycle life for reduction of the discharge quantity below 10 mAh was 273 cycles. At the 100th cycle and 200th cycle, the self-discharge rates at 25° C. for 30 days were 9.8% and 12.5%, respectively.

EXAMPLE 35

$Na_2O_2$ was mixed with $Co_2O_4$ at an $Na_2O_2/Co_3O_4$ molecular weight ratio of 1.26 (Na/CO atomic ratio=0.84), and the mixture was molded into a pellet. The temperature was elevated to 740° C. at a rate of 4° C./min in a dry oxygen atmosphere and calcination was carried out at 740° C. for 24 hours. Then, the calcination product was naturally cooled to room temperature and was thoroughly pulverized in a mortar. Then, 10 parts by weight of carbon black and 2.5 parts by weight of EPR (ethylene/propylene rubber) as the binder were thoroughly mixed with 100 parts by weight of the sodium-cobalt oxide. Then, the mixture was press-molded to a disc having a diameter of 15 mm so that a nickel net collector was included in the disc. The thus-prepared electrode was used as the positive electrode.

A negative electrode was prepared by incorporating 10 parts by weight of carbon black and 2.5 parts by weight of a fine powder of EPR (ethylene/propylene rubber) as the binder dissolved in xylene into 100 parts by weight of a sodium/lead alloy (Na/Pb atomic ratio=2.7) thoroughly pulverized in a mortar, removing xylene under a reduced pressure and press-molding the mixture into a disc having a diameter of 15 mm so that a nickel net collector was included in the disc.

A coin-type battery was assembled by using the thus-prepared positive and negative electrodes and a solution of 1.5 moles/l of $NaPF_6$ in 1,2-dimethoxyethane as the electrolyte. In this battery, charging and discharging were repeated at a constant current value of 5 mA within a voltage range of from 1.7 V to 3.2 V. The discharge quantity, the cycle life and the self-discharge rate after 20 days' standing at 60° C. after charging at the 100th cycle were examined. It was found that the maximum discharge quantity at each cycle was 16.2 mAh (corresponding to 0.42 electric equivalent per atom of Co), the cycle life was 320 cycles, and the self-discharge rate was 10.5%.

EXAMPLE 36

$Na_2O_2$ was thoroughly mixed with $Co_3O_4$ at an $Na_2O_2/Co_3O_4$ molecular weight of 1 (Na/Co atomic ratio=0.67), and the mixture was molded into a pellet. A disc-shaped positive electrode having a diameter of 15 mm was prepared from the pellet in the same manner as described in Example 1.

A negative electrode was prepared by incorporating 10 parts by weight of a graphite powder and 2.5 parts by weight of EPDM into 100 parts by weight of a sodium/lead alloy (Na/Pb atomic ratio=2.5) thoroughly pulverized in a mortar, mixing them thoroughly and molding the mixture in the same manner as described in Example 1.

A cell similar to that prepared in Example 1 was assembled by using the thus-prepared positive and negative electrode and the same electrolyte as used in Example 1. The performance of the battery cell was examined in the same manner as described in Example 1. The maximum discharge capacity was 14.7 mAh (corresponding to 0.38 electric equivalent per Co atom), the cycle life was 3.87 cycles, and the self-discharge rate was 10.3%.

EXAMPLE 37

A positive electrode was prepared in the same manner as described in Example 35 except that the Na/Co atomic ratio was changed to 0.60. A coin-type battery was assembled by using the thus-prepared positive electrode and the same negative electrode and electrolyte as used in Example 35. When the positive electrode active substance was subjected to the X-ray diffractometry and elementary analysis after the calcination, it was found that about 10% of $Co_3O_4$ remained unreacted in γ-type sodium-cobalt oxide.

The performance of the battery was examined in the same manner as described in Example 1. The maximum discharge capacity was 14.0 mAh, the cycle life was 218 cycles, and the self-discharge rate at 60° C. for 20 days was 12.5%.

EXAMPLE 38

A coin-type battery was assembled in the same manner as described in Example 35 except that the Na/Co atomic ratio was changed to 0.92, and the performance of the battery was examined. The maximum discharge capacity was 14.3 mAh, the cycle life was 153 cycles, and the self-discharge rate was 13.5%.

EXAMPLE 39

A high-purity sodium rod immersed in paraffin oil was taken out and the contaminated surface was shaved off. The sodium rod was mixed with an appropriate amount of granular lead (Na/Pb atomic ratio was 2.7/1) and the mixture was fused at 500° C. for 3 hours in an electric furnace. Then, the temperature was lowered to 350° C. and annealing was conducted for 20 hours. The temperature of the alloy was returned to room temperature, and the alloy was pulverized in a mortar. Predetermined amounts of an artificial graphite powder (supplied by Showa Denko) and carbon black (Black Pearl ® 2000 supplied by Showa-Cabot) was incorporated into the pulverized alloy and were thoroughly mixed.

A predetermined amount of EPDM (JSR-EP57P supplied by Japan Synthetic Rubber) dissolved in cyclohexane was mixed and kneaded with the above mixture to obtain a mixture having a sodium alloy/graphite powder/carbon black/EPDM weight ratio of 88/5/5/2.

A pellet-shape negative electrode having a diameter of 15 mm and a thickness of 300 μm was molded from the above mixture by a tablet-molding machine. Each of the foregoing operations were carried out in an argon gas atmosphere.

A coin-type battery as shown in FIG. 1 was assembled by using the thus-prepared negative electrode, a positive electrode prepared by incorporating 10 parts by weight of carbon black and 5 parts by weight of polytetrafluoroethylene into 100 parts by weight of $Na_{0.67}CoO_2$ prepared under heating from $Na_2O_2$ and $Co_3O_4$ and molding the mixture into a pellet, and a solution of 1 mole/l of $NaPF_6$ in 1,2-dimethoxyethane as the electrolyte.

The battery test was carried out by using the thus-assembled coin-type battery. First, discharging was carried out at a constant current value of 5 mA in the discharge direction until the battery voltage was reduced to 1.7 V. After a resting time of 30 minutes, charging was carried out at a constant current value of 5 mA until the battery voltage was elevated to 3.2 V. After a resting time of 30 minutes, discharging was conducted again, and thus the charging-discharging repetition test was carried out.

The maximum discharge capacity was 15.0 mAh and the cycle life was 350 cycles. At the 100th cycle and 200th cycle, the self-discharge rates at 250° C. for 30 days were 4.8% and 5.2%, respectively.

EXAMPLE 40

A high-purity sodium lamp was mixed with granular lead at a sodium/lead atomic ratio of 2.5/1. The mixture was fused at 500° C. for 4 hours, annealed at 350° C. for 15 hours and cooled to room temperature. The obtained alloy was thoroughly pulverized in a mortar, predetermined amounts of a thermal decomposition type graphite powder by the gas-phase growth method (supplied by Showa Denko) and carbon black (Black Pearl ® 2000 supplied by Showa-Cabot) were added to the pulverized alloy, and a predetermined amount of EPDM (JSR-EP57P supplied by Japan Synthetic Rubber) was mixed and kneaded with the mixture to form a mixture having a sodium alloy/graphite powder/carbon black/EPDM weight ratio of 89/3/6/2.

Excessive xylene was removed under a reduced pressure from this mixture, and a nickel net having a mesh size of 75 mesh was placed as a reinforcer on the mixture and a sheet having an overall thickness of 380 μm was molded from the mixture by a roller pressing method.

A disc having a diameter of about 15 mm was cut out from the thus-prepared negative electrode. A coin-type battery as shown in FIG. 1 was assembled by using the thus-prepared disc-shaped negative electrode, a positive electrode prepared by incorporating 5 parts by weight of carbon black and 5 parts by weight of polytetrafluoroethylene into 100 parts by weight of $Na_{0.67}CoO_2$ formed under heating from $Na_2O_2$ and $Co_3O_4$ and molding the mixture into a pellet, and a solution of 1 mole/l of $NaPF_6$ in 1,2-dimethoxyethane as the electrolyte.

The performance of the battery was examined in the same manner as described in Example 39. The maximum discharge quantity was 15.2 mAh and the cycle life for reduction of the discharge quantity below 10 mAh was 395 cycles. At the 100th cycle and 200th cycle, the self-discharge rates at 25° C. for 30 days were 5.3% and 5.5%, respectively.

EXAMPLE 41

A high-purity sodium lump was mixed with high-purity granular tin at a sodium/tin atomic ratio of 2.7/1, and the mixture was fused at 500° C. for 4 hours, annealed at 340° C. for 15 hours and cooled to room temperature.

The obtained alloy was thoroughly pulverized in a mortar, predetermined amounts of a graphite powder supplied by Showa Denko and carbon black supplied by Showa-Cabot were incorporated into the pulverized alloy, and a predetermined amount of EPDM (JSR-EP25X supplied by Japan Synthetic Rubber) dissolved in xylene was mixed and kneaded with the mixture to obtain a mixture having a sodium alloy/graphite powder/carbon black/EPDM weight ratio of 83/5/8/4.

The mixture was molded into a pellet-shaped negative electrode having a diameter of 15 mm and a thickness of 300 μm by a tablet-molding machine.

A coin-type battery as shown in FIG. 1 was assembled by using a thus-prepared negative electrode, the same positive electrode as used in Example 39 and a solution of 1 mole/l of NaPF$_6$ in 1,2-dimethoxyethane as the electrolyte. The battery test was carried out by using the thus-assembled battery in the same manner as described in Example 39. The maximum discharge quantity was 12.5 mAh and the cycle life for reduction of the discharge quantity below 10 mAh was 595 cycles. At the 100th cycle and 200th cycle, the self-discharge rates at 25° C. for 30 days were 4.8% and 4.7%, respectively.

EXAMPLE 42

A negative electrode was prepared in the same manner as described in Example 1 except that 10.2 g of a mixture comprising carbon black (Black Pearl ® 2000 supplied by Showa-Cabot) and acetylene black (Denka Black ® supplied by (Denki Kagaku Kogyo) at a weight ratio of 3/1 instead of the carbon black (Black Pearl ® 2000 supplied by Showa-Cabot) used in Example 1, the mixture was mixed with 2.5 g of EDPM, 10 g of the resulting mixture was mixed with 67.0 g of the alloy powder and 130 g of the resulting mixture was molded.

A coin-type cell was assembled by using the thus-prepared negative electrode and the same positive electrode, electrolyte and collector as used in Example 1. The voltage of the battery just after assembly was 2.51 V. Discharging was conducted at a constant current value of 2.5 mA in the discharge direction. The quantity of electricity that could be discharged before reduction of the battery voltage to 1.70 V was 10.4 mAh. The battery performance test was carried out in the same manner as described in Example 1. The discharge quantity of the battery at the 5th cycle was 17.8 mAh. The maximum discharge quantity of 18.5 mAh was recorded at the 14th cycle. The cycle life for reduction of the capacity to ½ was 325 cycles. The self-discharge rate of the battery at 25° C. for 1 month was 3.3%.

EXAMPLE 43

A negative electrode was prepared in the same manner as described in Example 1 except that acetylene black (Denka Black ® supplied by Denki Kagaku Kogyo) was used instead of the carbon black (Black Pearl ® 2000 supplied by Showa-Cabot) used in Example 1 and the weight and bulk density of the negative electrode exclusive of the collector were changed to 150 mg and 2.4 g/cm$^3$.

A coin-type cell was assembled by using the thus-prepared negative electrode and the same positive electrode, separator and electrolyte as used in Example 1. The performance of the thus-assembled battery was tested. The maximum discharge capacity of 18.3 mAh was recorded at the 12th cycle, and the cycle life for reduction of the capacity to ½ was 352 cycles. The self-discharge rate of the battery at 25° C. for 1 month was 3.2%.

EXAMPLE 44

The experiment was carried out in the same manner as described in Example 3 except that diethylene glycol dimethyl ether was used as the solvent of the electrolyte instead of 1,2-dimethoxyethane used in Example 3.

The maximum discharge capacity of the obtained battery was 14.5 mAh, the cycle life was 406 cycles, and the self-discharge rate was 3.2%. The discharge capacity at −20° C. was 7.0 mAh.

EXAMPLE 45

The experiment was carried out in the same manner as described in Example 3 except that 1-ethoxy-2-methoxyethane was used as the solvent of the electrolyte instead of 1,2-dimethoxyethane used in Example 3.

The maximum discharge capacity of the obtained battery was 14.3 mAh, the cycle life was 398 cycles, and the self-discharge rate was 3.1%. The discharge capacity at −20° C. was 7.1 mAh.

EXAMPLE 46

The experiment was carried out in the same manner as described in Example 3 except that a mixture comprising a graphite fiber prepared by the gas phase growth method (supplied by Showa Denko) and carbon black (Black Pearl ® 2000 supplied by Showa-Cabot) at a weight ratio of 1/1 was used as the carbon material of the negative electrode instead of the carbon black (Show-Black ® N110 supplied by Showa-Cabot) used in Example 3.

The maximum discharge capacity of the obtained battery was 16.8 mAh, the cycle life was 425 cycles, and the self-discharge rate at 25° C. for 1 month was 3.4%.

As is apparent from the foregoing illustration, the secondary battery of the present invention has a high energy density and a long cycle life, and high-speed charging and high-speed discharging are possible. Moreover, the secondary battery of the present invention has excellent low-temperature characteristics and a high performance. Furthermore, the battery may have various shapes, for example, a button-type battery, a coin-type battery and a cylinder-type battery.

We claim:

1. A secondary battery comprising a positive electrode, a negative electrode and a non-aqueous electrolyte, wherein the positive electrode comprises a sodium-cobalt oxide as the main component, the negative electrode is a composite body comprising at least 80% by weight of a sodium alloy, 3 to 20% by weight of a carbon material and 1 to 8% by weight of a binder, and the non-aqueous electrolyte comprises a sodium salt and an ether compound.

2. A secondary battery as set forth in claim 1, wherein the main components of the sodium alloy in the negative electrode are sodium and at least one metal selected from the group consisting of lead and tin.

3. A secondary battery as set forth in claim 1, wherein the carbon material of the negative electrode is selected from the group consisting of carbon black and graphite.

4. A secondary battery as set forth in claim 1, wherein the binder of the negative electrode is an olefin copolymer rubber.

5. A secondary battery as set forth in claim 1, wherein the sodium/cobalt atomic ratio in the sodium-cobalt oxide of the positive electrode is in the range of from 0.65/1 to 0.90/1.

6. A secondary battery as set forth in claim 1, wherein the sodium-cobalt oxide of the positive electrode comprises at least 70% of a γ-type crystal structure.

7. A secondary battery as set forth in claim 1, wherein the positive electrode is a mixture comprising the sodium-cobalt oxide, carbon black and a binder, in which the content of carbon black is not larger than 7% by weight and the content of the binder is not larger than 6% by weight.

8. A secondary battery as set forth in claim 1, wherein the binder of the positive electrode is a fluorohydrocarbon resin or an olefin copolymer rubber.

9. A secondary battery as set forth in claim 1, wherein the sodium salt of the non-aqueous electrolyte is $NaPF_6$ or $NaBF_4$.

10. A secondary battery as set forth in claim 1, wherein the ether compound of the non-aqueous electrolyte is at least one member selected from the group consisting of compounds represented by the following general formula:

$$R^1-O-(C_mH_{2m}O)_nR^2$$

wherein $R^1$ and $R^2$ independently stand for an alkyl group having 1 to 8 carbon atoms, m is 2 or 3, and n is an integer of from 1 to 8.

11. A secondary battery as set forth in claim 1, wherein the ether compound of the non-aqueous electrolyte is 1,2-dimethoxyethane.

12. A secondary battery as set forth in claim 1, wherein the ether compound of the non-aqueous electrolyte is selected from the group consisting of triethylene glycol dimethyl ether, triethylene glycol diethyl ether, tetraethylene glycol dimethyl ether, tetraethylene glycol diethyl ether, dipropylene glycol dimethyl ether, tripropylene glycol dimethyl ether, diethylene glycol dimethyl ether and 1-ethoxy-2-methoxyethane.

13. A secondary battery as set forth in claim 1, wherein the ether compound of the non-aqueous electrolyte is a mixture comprising 1,2-dimethoxyethane and a compound represented by the general formula:

$$R^1-O-(C_mH_{2m}O)_nR^2$$

wherein $R^1$ and $R^2$ independently stand for an alkyl group having 1 to 8 carbon atoms, m is 2 or 3, and n is an integer of from 2 to 8, at a mixing ratio from 20/1 to ½ by volume.

14. A secondary battery as set forth in claim 1, wherein the ether compound of the non-aqueous electrolyte is a mixture comprising 1,2-dimethoxyethane and tetraethylene glycol dimethyl ether at a mixing ratio of from 20/1 to ½ by volume.

15. A secondary battery as set forth in claim 1, wherein the bulk density of the positive electrode, exclusive of a collector, is 2.3 to 3.5 g/cm$^3$ and the bulk density of the negative electrode, exclusive of a collector, is 1.7 to 2.5 g/cm$^3$.

* * * * *